(12) United States Patent
Park et al.

(10) Patent No.: US 11,863,021 B2
(45) Date of Patent: Jan. 2, 2024

(54) ELECTRIC MOTOR AND HERMETIC COMPRESSOR HAVING THE SAME

(71) Applicant: LG Electronics Inc., Seoul (KR)

(72) Inventors: Inbum Park, Seoul (KR); Bokann Park, Seoul (KR); Chisung Park, Seoul (KR); Donghyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 17/524,938

(22) Filed: Nov. 12, 2021

(65) Prior Publication Data

US 2022/0209597 A1 Jun. 30, 2022

(30) Foreign Application Priority Data

Dec. 24, 2020 (KR) .................. 10-2020-0183451

(51) Int. Cl.
| | |
|---|---|
| *H02K 1/00* | (2006.01) |
| *H02K 7/00* | (2006.01) |
| *H02K 21/00* | (2006.01) |
| *H02K 1/276* | (2022.01) |
| *F04B 35/04* | (2006.01) |

(Continued)

(52) U.S. Cl.
CPC .............. *H02K 1/276* (2013.01); *F04B 35/04* (2013.01); *F25B 31/023* (2013.01); *H02K 1/28* (2013.01); *H02K 7/02* (2013.01); *H02K 21/14* (2013.01)

(58) Field of Classification Search
CPC H02K 1/276; H02K 1/28; H02K 7/02; H02K 21/14; H02K 7/14; H02K 2213/03; H02K 1/2766; H02K 5/207; H02K 9/10; H02K 1/08; H02K 1/16; F04B 35/04; F04B 39/00; F04B 39/0005; F04B 39/12; F25B 31/023; Y02E 60/16; F04C 23/008; F05B 2210/14; F05B 2260/40

See application file for complete search history.

(56) References Cited

U.S. PATENT DOCUMENTS

| | | | |
|---|---|---|---|
| 6,242,830 B1* | 6/2001 | Katagiri | H02K 1/187 384/114 |
| 2020/0313478 A1* | 10/2020 | Mukai | H02K 1/276 |

FOREIGN PATENT DOCUMENTS

| | | |
|---|---|---|
| CN | 102457113 | 5/2012 |
| CN | 102655363 | 9/2012 |

(Continued)

OTHER PUBLICATIONS

KR 20130094658 A (Year: 2013).*

(Continued)

*Primary Examiner* — Quyen P Leung
*Assistant Examiner* — Elrasheed E. B. Hamdan
(74) *Attorney, Agent, or Firm* — Fish & Richardson P.C.

(57) ABSTRACT

A hermetic compressor includes an electric motor that includes a rotor having a plurality of permanent magnets inserted into a rotor core, a connection part made of a non-magnetic material and provided at an axial end portion of the rotor core, and an inertial core made of a magnetic material and provided at an axial end of the connection part. The connection part includes a plurality of first fixing portions, a plurality of second fixing portions spaced apart from the plurality of first fixing portions in an axial direction, and a plurality of link portions disposed between the plurality of first fixing portions and the plurality of second fixing portions.

21 Claims, 15 Drawing Sheets

(51) Int. Cl.
  *F25B 31/02*   (2006.01)
  *H02K 1/28*    (2006.01)
  *H02K 7/02*    (2006.01)
  *H02K 21/14*   (2006.01)

(56) References Cited

FOREIGN PATENT DOCUMENTS

| | | |
|---|---|---|
| CN | 207910610 | 9/2018 |
| CN | 110326190 | 10/2019 |
| CN | 111742475 | 10/2020 |
| EP | 3163083 | 5/2017 |
| JP | 2001304121 | 10/2001 |
| JP | 2005307845 | 11/2005 |
| JP | 2006-217725 | 8/2006 |
| JP | 2012-005169 | 1/2012 |
| JP | 2017-082684 | 5/2017 |
| JP | 06680779 | 4/2020 |
| JP | 2020148109 | 9/2020 |
| KR | 20070055960 | 5/2007 |
| KR | 10-2007-0071407 | 7/2007 |
| KR | 20100081815 | 7/2010 |
| KR | 20130094658 | 8/2013 |

OTHER PUBLICATIONS

KR 20070071407 A (Year: 2007).*
KR 20100081815 A (Year: 2010).*
JP 2001304121 A (Year: 2001).*
KR20060024740 A (Year: 2006).*
Office Action in Korean Appln. No. 10-2020-0183451, dated Oct. 26, 2022, 10 pages (with English translation).
Extended European Search Report in European Appln. No. 21207465.2, dated May 2, 2022, 5 pages.
Notice of Allowance in Chinese Appln. No.202111564758.4, dated Apr. 15, 2023, 16 pages (with English translation).
Notice of Allowance in Korean Appln. No. 10-2020-0183451, dated Apr. 6, 2023, 14 pages (with English translation).

* cited by examiner

ELECTRIC MOTOR AND HERMETIC COMPRESSOR HAVING THE SAME

CROSS-REFERENCE TO RELATED APPLICATION

Pursuant to 35 U.S.C. § 119(a), this application claims the benefit of the earlier filing date and the right of priority to Korean Patent Application No. 10-2020-0183451, filed on Dec. 24, 2020, the contents of which are incorporated by reference herein in their entirety.

TECHNICAL FIELD

The present disclosure relates to an electric motor, and a hermetic compressor having the same.

BACKGROUND

A hermetic compressor may include a shell that accommodates a motor unit and a compression unit defining a compressor body. For example, the hermetic compressor may refer to a device or assembly of a compressor and a motor that are confined in an outer shell sealed by various coupling techniques such as welding. The hermetic compressor can be classified into a reciprocating type, a rotary type, a vane type, a scroll type, and the like according to a method of compressing a refrigerant. In some cases, a compressor is configured such that an electric motor (or driving motor) is implemented as a rotary motor.

In some examples, the hermetic compressors may have reduced sizes with an increased power density per unit volume of an electric motor. In some cases, when the electric motor is reduced in size, inertia of the electric motor may be lowered to thereby reduce the efficiency of the compressor, increase vibration, and reduce mechanical reliability.

In some examples, inertia may be increased by disposing a core (a second steel plate) at an end portion of a rotor (a first steel plate). In some cases, as the core is located adjacent to a permanent magnet inserted into the rotor, magnetic flux leakage of the permanent magnet through the core may occur.

For example, the magnetic flux leakage of the permanent magnet may be suppressed by inserting a non-magnetic plate between the rotor and the core. In some cases, the magnetic flux leakage of the permanent magnet may not be effectively prevented as the rotor and the core are closely located to each other due to a thin thickness of the non-magnetic plate. In some cases, when the thickness of the non-magnetic plate is increased, the manufacturing cost of the electric motor can be increased because the non-magnetic material is relatively expensive compared to the magnetic material.

In some examples, a magnetic core (rotational inertia) may be installed at an axial end portion of a rotor. In some case, where a core (rotating inertial body) is entirely made of a magnetic material and has a cylindrical shape, magnetic flux leakage may be increased, and weight of the rotor in relation to the degree of compensation of inertia force may also be increased, thereby lowering the motor efficiency.

SUMMARY

The present disclosure describes an electric motor that can increase the efficiency and achieve the reduce reduction, and a hermetic compressor having the same.

The present disclosure describes an electric motor that can increase the efficiency and achieve the size reduction by increasing rotational inertia of a rotor, and a hermetic compressor having the same.

The present disclosure describes an electric motor that can achieve the size reduction and high efficiency by increasing rotational inertia while suppressing magnetic flux leakage of a permanent magnet inserted into a rotor, and a hermetic compressor having the same.

The present disclosure further describes an electric motor that can achieve the size reduction and high efficiency while reducing manufacturing costs, and a hermetic compressor having the same.

The present disclosure further describes an electric motor that can achieve the size reduction and high efficiency while reducing manufacturing costs by reducing the amount of use of a relatively expensive non-magnetic material, and a hermetic compressor having the same.

The present disclosure further describes an electric motor that can reduce the amount of use of a relatively expensive non-magnetic material and suppress magnetic flux leakage from a permanent magnet inserted into a rotor to reduce manufacturing costs to thereby achieve the size reduction and high efficiency, and a hermetic compressor having the same.

In some implementations, an inertial core can be installed at a rotor core into which a permanent magnet is inserted. A connection part adjacent to the permanent magnet can be made of a non-magnetic material, and the inertial core disposed away from the permanent magnet can be made of a magnetic material. With this configuration, the present disclosure provides an electric motor that can achieve the size reduction and high efficiency by increasing rotational inertia of the rotor while suppressing magnetic flux leakage from the permanent magnet, and a hermetic compressor having the same.

In some implementations, an electric motor has a structure in which a portion of an inertial core is made of a non-magnetic material, and a cross-sectional area of the non-magnetic material is smaller than a cross-sectional area of a rotor core or a portion of the inertial core formed of a magnetic material. A hermetic compressor can include the electric motor. As a result, an amount of use of the non-magnetic material can be reduced to thereby reduce manufacturing costs and achieve the size reduction and high efficiency.

According to one aspect of the subject matter described in this application, an electric motor includes a stator and a rotor configured to rotate relative to the stator, where the rotor includes a rotating shaft, a rotor core coupled to the rotating shaft, and a plurality of permanent magnets that are inserted into the rotor core and spaced apart from one another in a circumferential direction. The electric motor further includes an inertial core made of a magnetic material and spaced apart from the rotor in an axial direction, and a connection part made of a non-magnetic material and disposed between the rotor and the inertial core in the axial direction, where the connection part is disposed at an axial end portion of the rotor core. The connection part includes a single body that includes a plurality of first fixing portions coupled to the axial end portion of the rotor core, a plurality of second fixing portions spaced apart from the plurality of first fixing portions in the axial direction and coupled to the inertial core, and a plurality of link portions that extend toward one another and are bent from the plurality of first fixing portions and the plurality of second fixing portions.

Each of the plurality of link portions connects one of the plurality of first fixing portions to one of the plurality of second fixing portions.

Implementations according to this aspect can include one or more of the following features. For example, the plurality of first fixing portions can be spaced apart from one another by first predetermined intervals in the circumferential direction, and the plurality of second fixing portions can be spaced apart from one another by second predetermined intervals in the circumferential direction. In some examples, the plurality of first fixing portions and the plurality of second fixing portions can protrude in the axial direction and are alternately arranged along the circumferential direction.

In some implementations, each of the plurality of first fixing portions can include a first inner arcuate end portion, a first outer arcuate end portion disposed radially outward relative to the first inner arcuate end portion, and a plurality of first linear end portions that radially connect ends of the first inner arcuate end portion to ends of the first outer arcuate end portion, respectively, where each of the ends of the first inner arcuate end portion radially faces one of the ends of the first outer arcuate end portion. Each of the plurality of second fixing portions can include a second inner arcuate end portion, a second outer arcuate end portion disposed radially outward relative to the second inner arcuate end portion, and a plurality of second linear end portions that connect ends of the second inner arcuate end portion to ends of the second outer arcuate end portion, respectively, where each of the ends of the second inner arcuate end portion radially faces one of the ends of the second outer arcuate end portion.

In some examples, each of the plurality of link portions can extend in a lengthwise direction and connect one of the plurality of first linear end portions to one of the plurality of second linear end portions. In some implementations, each of the plurality of first fixing portions can cover at least portions of the plurality of permanent magnets in the axial direction. In some implementations, a circumferential center of one of the plurality of first fixing portions can be disposed between two adjacent permanent magnets among the plurality of permanent magnets in the circumferential direction.

In some implementations, the connection part can include a plurality of bending line portions that are defined (i) between one of the plurality of first fixing portions and one of the plurality of link portions that face each other, and (ii) between one of the plurality of second fixing portions and one of the plurality of link portions that face each other. The connection part can further include a plurality of reinforcing ribs, where each of the plurality of reinforcing ribs protrudes from one of the plurality of bending line portions.

In some implementations, at least a portion of the connection part is inclined with respect to the axial direction. For example, the connection part can include (i) a first portion inclined in a first direction with respect to the axial direction and (ii) a second portion inclined in a second direction with respect to the axial direction, where the first portion and the second portion are alternately disposed along the circumferential direction.

In some implementations, at least a portion of the connection part can be inclined with respect to an end surface of the rotor core by a predetermined inclination angle, where the predetermined inclination angle can be greater than or equal to 20 degrees and less than 90 degrees, for example. In some implementations, a height of the connection part in the axial direction can be greater than or equal to a thickness of the inertial core, or greater than or equal to 4 mm, for instance.

In some implementations, the connection part can include a plurality of boss portions that are respectively disposed at the plurality of first fixing portions and axially extend toward the inertial core, or that are respectively disposed at the plurality of second fixing portions and axially extend toward the rotor core. In some examples, end portions of the plurality of boss portions can be axially supported by the inertial core or the rotor core.

In some implementations, the inertial core can include a plate body having a circular shape, where an outer diameter of the plate body is greater than a width of the connection part in a radial direction. In some implementations, the inertial core can define a through hole having an annular shape at a center of the inertial core. In some examples, the rotor core can define a plurality of first coupling holes that extend parallel to the plurality of permanent magnets and are arranged along the circumferential direction, and the connection part can define a plurality of second coupling holes at the plurality of first fixing portions, respectively, where each of the plurality of second coupling holes faces one of the plurality of first coupling holes. The connection part and the rotor core can be coupled to each other through the plurality of first coupling holes and the plurality of second coupling holes.

In some implementations, the connection part can include a plurality of third coupling holes at the plurality of second fixing portions, respectively, and the inertial core can define a plurality of fourth coupling holes that faces the plurality of third coupling holes, respectively, where the connection part and the inertial core are coupled to each other through the plurality of third coupling holes and the plurality of fourth coupling holes. In some examples, the inertial core can define a plurality of grooves that extend from the through hole in a radial direction, where the plurality of grooves and the plurality of fourth coupling holes are alternately arranged along the circumferential direction.

In some implementations, the electric motor can further include a mass portion disposed on at least one axial surface of the inertial core such that an axial thickness of an outer circumferential side of the inertial core is different from an axial thickness of an inner circumferential side of the inertial core. In some implementations, the connection part can include a plurality of support bosses that extend in the axial direction and are arranged along the circumferential direction. In some examples, the plurality of support bosses can be separated from one another. In other examples, the connection part can further include a connecting rib that connects the plurality of support bosses to one another.

According to another aspect, a hermetic compressor can include an electric motor, a shell that accommodates the electric motor, and a compression unit disposed in the shell and configured to compress a refrigerant, where the electric motor is configured to provide a driving force to the compression unit.

Implementations according to this aspect can include one or more of the features describe above with respect to the electric motor or the following features. For example, the compression unit can include a cylinder, a piston disposed in the cylinder, and a connecting rod having one end connected to the piston and another end connected to the rotating shaft of the electric motor.

In some implementations, an inertial core can be installed at a rotor core having permanent magnets inserted therein, and a connection part located adjacent to the permanent magnets can be made of a non-magnetic material, whereas the rotor core located far away from the permanent magnets can be made of a magnetic material. Accordingly, magnetic flux leakage from the permanent magnets can be suppressed while increasing rotational inertia of the rotor to thereby achieve the size reduction and high efficiency.

In some implementations, the connection part disposed between the rotor core and the inertial core can be formed of a magnetic material and have a cross-sectional area smaller than a cross-sectional area of the rotor core or a portion of the inertial core formed of a magnetic material. As a result, an amount of use of non-magnetic material can be reduced to thereby lower manufacturing costs and achieve the size reduction and high efficiency.

In some implementations, an outer diameter of the inertial core can be greater than an outer diameter of the rotor core to allow the inertial core to overlap an upper side of a permanent coil. This can result in increasing rotational inertia of the inertial core to thereby increase the efficiency of the motor and the compressor.

In some implementations, the connection part disposed between the rotor core and the inertial core can be disposed between two permanent magnets facing each other in a circumferential direction. As a result, the two permanent magnets can be supported in an axial direction by one connection part. Thus, even when the connection part is formed of a magnetic material, a cross-sectional area of the magnetic material can be reduced to thereby minimize magnetic flux leakage from the permanent magnets and securely support the permanent magnets.

In some implementations, the connection part connected to the rotor core and the inertial core coupled to the connection part can be configured such that an axial height of the connection part can be greater than an axial height of the inertial core. Accordingly, a distance between the permanent magnet and the inertial core can be increased to thereby reduce magnetic flux leakage from the permanent magnets even when the inertial core is formed of a magnetic material.

In some implementations, rotational inertia of the inertial core can be greater than rotational inertia of the rotor core including the permanent magnets. This can result in increasing the entire rotational inertia of the rotor to thereby achieve the size reduction and high efficiency.

DETAILED DESCRIPTION

Hereinafter, implementations the present disclosure will be described in detail with reference to the accompanying drawings. As described above, a hermetic compressor in which an electric motor constituting a motor unit is installed in a shell together with a compression unit can be divided into a rotary (or rotating) motor or reciprocating motor according to operation of a rotor. Herein, a connection-type reciprocating compressor in which a rotating shaft (or crankshaft) is connected to a piston, among hermetic compressors to which a rotatory motor is applied, will be used as a representative example. However, it is not limited to the connection-type reciprocating compressor, and can also be employed in an electric motor configured as a rotary motor and a hermetic compressor having the same.

Figure 1:
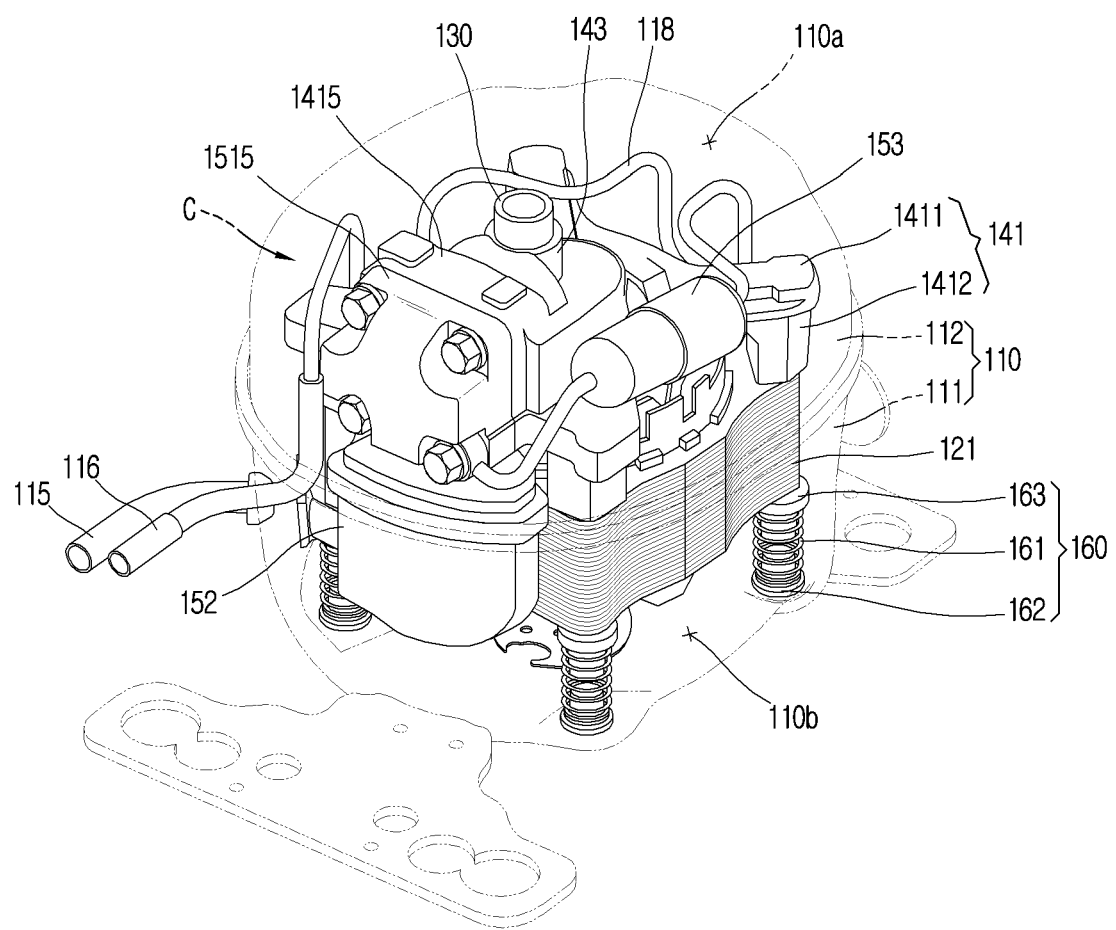
FIG. 1 is a see-through perspective view illustrating an example of a shell of an example of a reciprocating compressor.
Figure 2:
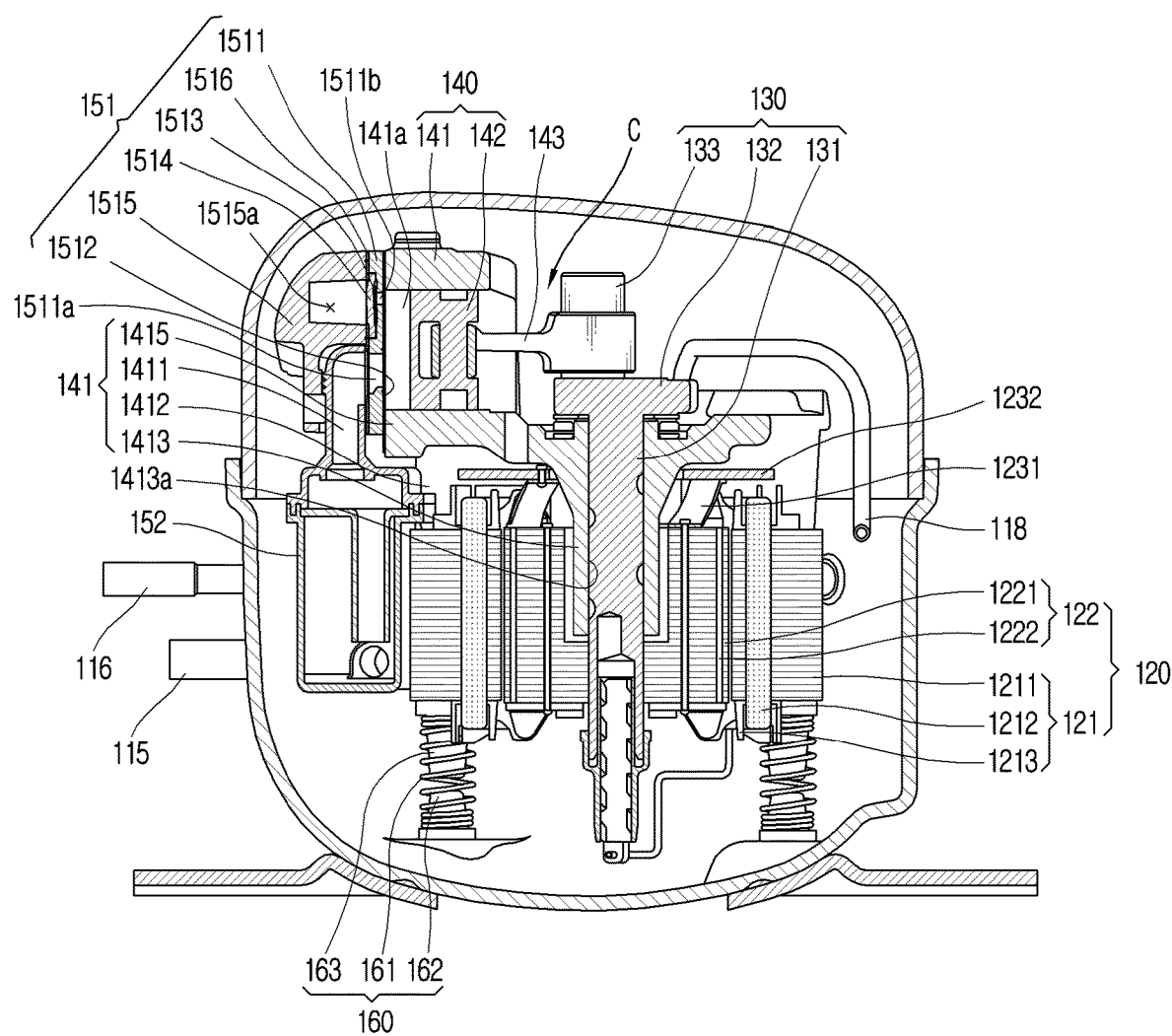
FIG. 2 is a cross-sectional view illustrating an example of an inside of the reciprocating compressor of FIG. 1.

FIG. 1 is a see-through perspective view illustrating an example of a shell of an example of a reciprocating compressor, and FIG. 2 is a cross-sectional view illustrating an example of an inside of the reciprocating compressor of FIG. 1.

In some implementations, as illustrated in FIGS. 1 and 2, a reciprocating compressor can include a shell 110 that defines an outer appearance, an electric motor (or motor unit) 120 that is provided at an inner space 110a of the shell 110 and provides a driving force, a compression unit 140 that compresses a refrigerant by receiving the driving force from the electric motor 120, a suction and discharge part 150 that guides a refrigerant to a compression chamber and discharges a compressed refrigerant, and a support part 160 that supports a compressor body C including the electric motor 120 and the compression unit 140 with respect to the shell 110.

In some examples, the shell 110 can include a lower shell 111 and an upper shell 112. For example, the lower shell 111 and the upper shell 112 can be coupled to each other and define a hermetically sealed inner space 110a. The electric motor 120 and the compression unit 140 are accommodated in the inner space 110a of the shell 110. The shell 110 is made of an aluminum alloy (hereinafter, abbreviated as "aluminum") that is lightweight and has a high thermal conductivity.

In some examples, the lower shell 111 can have a substantially hemisphere shape. A suction pipe 115, a discharge pipe 116, and a process pipe are coupled to the lower shell 111 in a penetrating manner. The suction pipe 115, the discharge pipe 116, and the process pipe can be coupled to the lower shell 111 by insert die casting.

The upper shell 112 has a substantially hemispherical shape like the lower shell 111. The upper shell 112 is coupled from above to the lower shell 111 to thereby define the inner space 110a of the shell 110.

The upper shell 112 and the lower shell 111 can be coupled by welding. In some implementations, the upper shell 112 and the lower shell 111 can be coupled by a bolt when they are made of an aluminum material that is not suitable for welding.

A description will now be given of the electric motor that defines the motor unit.

As illustrated in FIGS. 1 and 2, the electric motor 120 includes a stator 121 and a rotor 122. The stator 121 is elastically supported with respect to the inner space 110a of the shell 110, namely, a bottom surface of the lower shell 111, and the rotor 122 is rotatably installed inside the stator 121.

The stator 121 includes a stator core 1211 and a stator coil 1212.

The stator core 1211 is made of a metal material, such as an electrical steel sheet, and performs electromagnetic interaction with the stator coil 1212 and the rotor 122 described hereinafter through an electromagnetic force when a voltage is applied to the electric motor 120 from the outside.

The stator core 1211 has a substantially rectangular cylinder shape. For example, an inner circumferential surface of the stator core 1211 can be formed in a circular shape, and an outer circumferential surface thereof can be formed in a rectangular shape. The stator core 1211 is fixed to a lower surface of a main bearing 141 by a stator coupling bolt.

A lower end of the stator core 1211 is supported with respect to a bottom surface of the shell 110 by a support spring 161 to be described hereinafter in a state that the stator core 1211 is axially and radially spaced apart from an inner surface of the shell 110. This can reduce or prevent vibration generated during operation from being directly transferred to the shell 110.

The stator coil 1212 is wound inside the stator core 1211. When a voltage is applied from the outside, the stator coil 1212 generates an electromagnetic force to perform electromagnetic interaction with the stator core 1211 and the rotor 122. This can allow the electric motor 120 to generate a driving force that causes the compression unit 140 to perform a reciprocating motion.

In some examples, an insulator 1213 can be disposed between the stator core 1211 and the stator coil 1212. This can help to prevent direct contact between the stator core 1211 and the stator coil 1212 to thereby facilitate the electromagnetic interaction.

The rotor 122 includes a rotor core 1221, permeant magnets 1222, a connection part 1231, and an inertial core 1232.

The rotor core 1221, like the stator core 1211, can be made of a metal material such as an electrical steel plate, and a shaft hole 1221a to which a rotating shaft 130 defining a motor shaft is press-fitted and coupled can be formed at a center of the rotor core 1221. The shaft hole 1221a can be formed through the rotor core 1221 in an axial direction, such that the rotor core 1221 has a cylindrical shape. As for the connection type reciprocating compressor, a motor shaft is usually referred to as a crank shaft. However, since the electric motor according to the present disclosure is not necessarily limited to the connection type reciprocating compressor, the motor shaft will be hereinafter referred to as a rotating shaft.

The rotating shaft 130 includes a main shaft portion 131 and an eccentric shaft portion 133 provided at opposite ends of a plate portion 132 in the axial direction. A connecting rod 143 defining a portion of the compression unit 140 to be described hereinafter is rotatably coupled to the eccentric shaft portion 133, and a piston 142 defining a portion of the compression unit 140 to be described hereinafter can be coupled to an end of the connecting rod 143. Accordingly, when a voltage is applied to the rotor 122, the rotating shaft 130 rotates together with the rotor 122 to thereby transmit a rotational force of the electric motor 120 to the compression unit 140.

A magnet mounting hole 1221b in which the permanent magnet 1222 is inserted can be formed through an edge of the rotor core 1221 in the axial direction. The magnet mounting hole 1221b can be provided in plurality to be disposed at predetermined intervals in a circumferential direction.

A plurality of magnet mounting holes 1221b can be formed with respect to the shaft hole 1221a. In some examples, the magnet mounting hole 1221b can be formed through both ends or a portion of the rotor core 1221 in the axial direction according to a shape of the rotor core 1221.

For example, when the rotor core 1221 is formed in a single shape and is disposed inside the stator core 1211, the magnet mounting hole 1221b can be formed through the both ends of the rotor core 1221 in the axial direction. However, when the rotor core 1221 is formed in a two-stage shape and a portion of the rotor core 1221 is disposed at an outside of the stator core 1211, the magnet mounting hole 1221b can be formed only at the rotor core 1221 located at an inside of the stator core 1211. The rotor core 1221 will be described later together with the connection part 1231 and the inertial core 1232.

The permanent magnets 1222 can be inserted into the respective magnet mounting holes 1221b at equal intervals in a circumferential direction of the rotor core 1221. The permanent magnets 1222 can each have a rectangular cross-sectional shape to be elongated in the axial direction.

An axial length of the permanent magnet 1222 can be substantially the same as an axial length of the rotor core 1221. Accordingly, once the permanent magnet 1222 is inserted into the magnet mounting hole 1221b of the rotor core 1221, the permanent magnet 1222 is not separated therefrom due to the connection part 1231 to be described hereinafter. The permanent magnet 1222 will be described later together with the connection part 1231 and the inertial core 1232.

Hereinafter, the compression unit will be described.

As illustrated in FIGS. 1 and 2, the compression unit 140 includes the main bearing 141 and the piston 142. The main bearing 141 is elastically supported on the shell 110, and the piston 142 is coupled to the rotating shaft 130 by the connecting rod 143 to perform a relative motion with respect to the main bearing 141.

The main bearing 141 is provided at an upper side of the electric motor 120. The main bearing 141 includes a frame 1411 (or frame portion), a fixing protrusion 1412 coupled to the stator 121 of the electric motor 120, a bearing portion 1413 (or shaft receiving portion) that supports the rotating shaft 130, and a cylinder unit (cylinder) 1415 that defines a compression chamber 141a.

The frame 1411 can have a flat plate shape extending in a horizontal direction, or a radial plate shape by processing a portion of an edge excluding corners to reduce weight or thickness.

The fixing protrusion 1412 is provided at an edge of the frame 1411. For example, the fixing protrusion 1412 can protrude from the edge of the frame 1411 toward the electric motor 120, namely, in a downward direction.

The main bearing 141 and the stator 121 can be coupled by a stator coupling bolt to be elastically supported on the lower shell 111 together with the stator 121 of the electric motor 120.

The bearing portion 1413 can axially extend from a central portion of the frame 1411 in opposite directions. A bearing hole 1413a can be axially formed through the bearing portion 1413 so as to allow the rotating shaft 130 to penetrate therethrough, and a bush bearing can be insertedly coupled to an inner circumferential surface of the bearing hole 1413a.

The plate portion 132 of the rotating shaft 130 can be supported on an upper end of the bearing portion 1413 in the axial direction, and the main shaft portion 131 of the rotating shaft 130 can be supported on an inner circumferential surface of the bearing portion 1413 in a radial direction. Accordingly, the rotating shaft 130 can be axially and radially supported by the main bearing 141.

The cylinder unit (hereinafter, abbreviated as "cylinder") 1415 is radially eccentric from an edge of one side of the frame 1411. The cylinder 1415 is formed through the main bearing 141 in the radial direction so that the piston 142 connected to the connecting rod 143 is inserted into an inner open end thereof, and a valve assembly 151 defining the suction and discharge part 150 to be described hereinafter is inserted into an outer open end thereof.

The piston 142 is configured such that a side (a rear side) that faces the connecting rod 143 is open and an opposite side thereof, namely, a front side is closed. Accordingly, the connecting rod 143 is inserted into the rear side of the piston 142 to be rotatably coupled, and the front side of the piston 142 is formed in a closed shape to define the compression chamber 141a inside the cylinder 1415 together with the valve assembly 151 to be described hereinafter.

In some implementations, the piston 142 can be made of the same material as the main bearing 141, such as an aluminum alloy. This can help to prevent a magnetic flux from being transmitted to the piston 142 from the rotor 122.

As the piston 142 is made of the same material as the main bearing 141, the piston 142 and the main bearing 141 (more precisely, the cylinder) can have the same coefficient of thermal expansion. Accordingly, even when the inner space 110a of the shell 110 is in high temperature condition (approximately 100° C.) during operation of the compressor, interference between the main bearing 141 and the piston 142, caused by thermal expansion, can be suppressed or reduced.

Hereinafter, the suction and discharge part will be described.

Referring back to FIGS. 1 and 2, the suction and discharge part 150 includes the valve assembly 151, a suction muffler 152, and a discharge muffler 153. The valve assembly 151 and the suction muffler 152 are sequentially coupled from the outer open end of the cylinder 1415.

The valve assembly 151 includes a valve plate 1511, a suction valve 1512, a discharge valve 1513, a valve stopper 1514, and a discharge cover 1515.

The valve plate 1511 has a substantially rectangular plate shape and is installed to cover a front-end surface of the main bearing 141, namely, a front open surface of the compression chamber 141a. For example, a coupling hole is provided at each corner of the valve plate 1511, so as to be coupled to a coupling groove formed on the front-end surface of the main bearing 141 by a bolt.

In some implementations, one suction port 1511a and at least one discharge port 1511b can be defined in the valve plate 1511. When a plurality of discharge ports 1511b are provided, the suction port 1511a can be formed at a central portion of the valve plate 1511, and the plurality of discharge ports 1511b can be formed along a circumference of the suction port 1511a to be spaced apart by predetermined intervals or gaps.

The suction valve 1512 can be disposed at a side facing the piston 142 based on the valve plate 1511. Accordingly, the suction valve 1512 can be bent in a direction toward the piston 142 to be opened and closed.

The discharge valve 1513 can be disposed at an opposite side of the piston 142 based on the valve plate 1511. Accordingly, the discharge valve 1513 can be bent in a direction opposite to the piston 142 to be opened and closed.

The valve stopper 1514 can be disposed between the valve plate 1511 and the discharge cover 1515 with the discharge valve 1513 interposed therebetween. The valve stopper 1514 is fixed by being pressed by the discharge cover 1515 in a state that one end thereof is in contact with a fixing portion of the discharge valve 1513.

The discharge cover 1515 can be coupled to the front-end surface of the main bearing 141 with the valve plate 1511 interposed therebetween, allowing the compression chamber 141a to be finally covered by the discharge cover 1515. Therefore, the discharge cover 1515 can also be referred to as a "cylinder cover".

The suction muffler 152 can be fixed by the valve assembly 151 to communicate with the suction port 1511a of the valve plate 1511. Accordingly, the suction muffler 152 transfers a refrigerant suctioned through the suction pipe 115 to the compression chamber 141a of the cylinder 1415.

The suction muffler 152 is provided therein with a suction space portion. An inlet (or entrance) of the suction space portion communicates with the suction pipe 115 in a direct or indirect manner, and an outlet (or exit) of the suction space portion directly communicates with a suction side of the valve assembly 151.

The discharge muffler 153 can be installed separately from the main bearing 141.

The discharge muffler 153 is provided therein with a discharge space portion. An inlet of the discharge space portion can be connected to a discharge side of the valve assembly 151 by a loop pipe 118, and an outlet of the discharge space portion can be directly connected to the discharge pipe 116 by the loop pipe 118.

Hereinafter, the support part will be described.

In some implementations, as illustrated in FIGS. 1 and 2, the support parts 160 can support between a lower surface of the electric motor 120 and the bottom surface of the lower shell 111 that faces the lower surface the electric motor 120, which, for example, support four corners of the electric motor 120 with respect to the shell 110.

For example, each of the support parts 160 can include a support spring 161, a first spring cap 162 that supports a lower end of the support spring 161, and a second spring cap 163. In other words, each support part 160 defines one unitary support assembly made up of the support spring 161, the first spring cap 162, and the second spring cap 163, and the unitary support assemblies can be installed along a periphery of the compressor body at predetermined intervals.

The support spring 161 is configured as a compression coil spring. The first spring cap 162 is fixed to the bottom surface of the lower shell 111 to support the lower end of the support spring 161, and the second spring cap 163 is fixed to a lower end of the electric motor 120 to support an upper end of the support spring 161. Accordingly, the support springs 161 are supported by the respective first spring caps 162 and the respective second spring caps 163, so as to elastically support the compressor body C with respect to the shell 110.

In the drawings, an unexplained reference numeral 110*b* denotes an oil storage space.

The reciprocating compressor described above can operate as follows.

That is, when power is applied to the electric motor 120, the rotor 122 rotates. When the rotor 122 rotates, the rotating shaft 130 coupled to the rotor 122 rotates together, causing a rotational force to be transferred to the piston 142 through the connecting rod 143. The connecting rod 143 allows the piston 142 to perform a reciprocating motion in a front and rear direction (or back and forth) with respect to the cylinder 141*b*.

In detail, when the piston 142 moves backward from the cylinder 141*b*, volume of the compression chamber 141*a* increases. When the volume of the compression chamber 141*a* is increased, a refrigerant filled in the suction muffler 152 passes through the suction valve 1512 of the valve assembly 151, and is then suctioned into the compression chamber 141*a* of the cylinder 141*b*.

In contrast, when the piston 142 moves forward from the cylinder 141*b*, volume of the compression chamber 131*a* decreases. When the volume of the compression chamber 141*a* is decreased, a refrigerant filled in the compression chamber 141*a* is compressed, passes through the discharge valve 1513 of the valve assembly 151, and is then discharged to a discharge chamber 1515*a* of the discharge cover 1515. This refrigerant flows into the discharge space portion of the discharge muffler 153 through the loop pipe 118 and is then discharged to a refrigeration cycle through the loop pipe 118 and the discharge pipe 116. Such series of processes are repeated.

As described above, in the hermetic compressor, both the electric motor defining the motor unit and the compression unit are installed in the shell. When the compressor is reduced in size, a size of the electric motor is also decreased, and a size of the rotor defining a portion of the electric motor is reduced accordingly. A smaller rotor leads to a decrease in rotational inertia, which can be disadvantageous in terms of motor efficiency.

In order to help to prevent this, the rotor can be further provided with an inertial core for compensating the decrease of the rotational inertia while achieving the size reduction of the rotor and the compressor.

Figure 3:
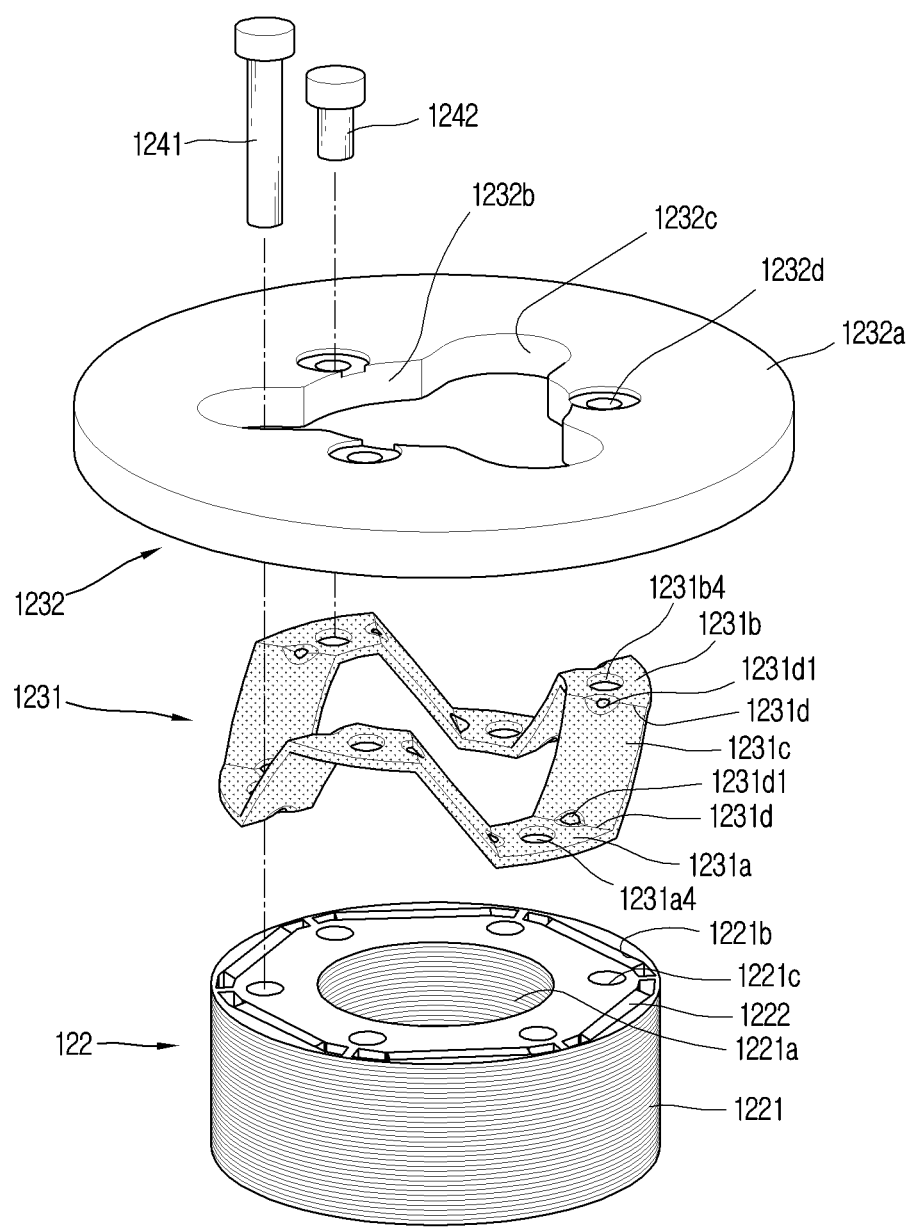
FIG. 3 is an exploded perspective view illustrating examples of an inertial core and a rotor.
Figure 4:
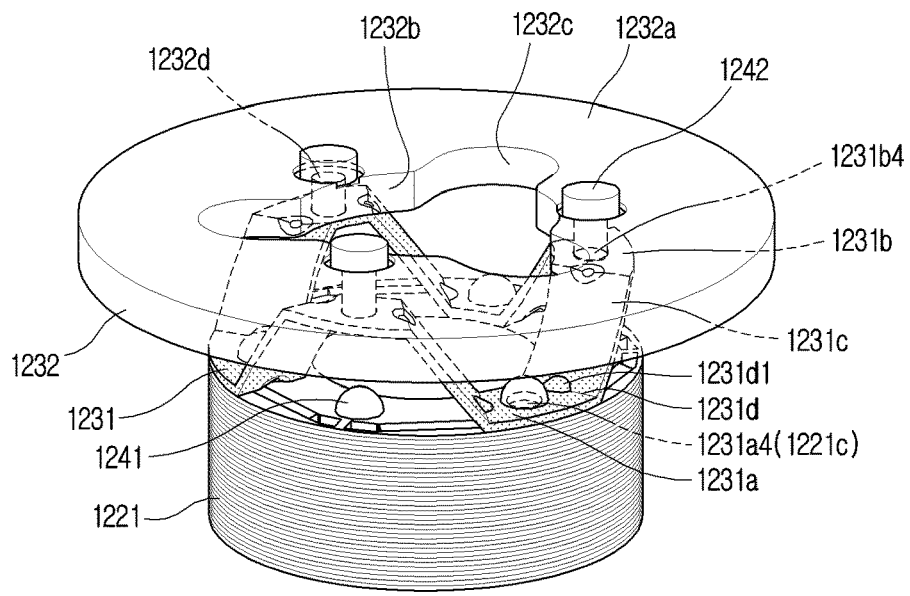
FIG. 4 is a perspective view illustrating an example of a coupled state of the inertial core and the rotor.
Figure 5:
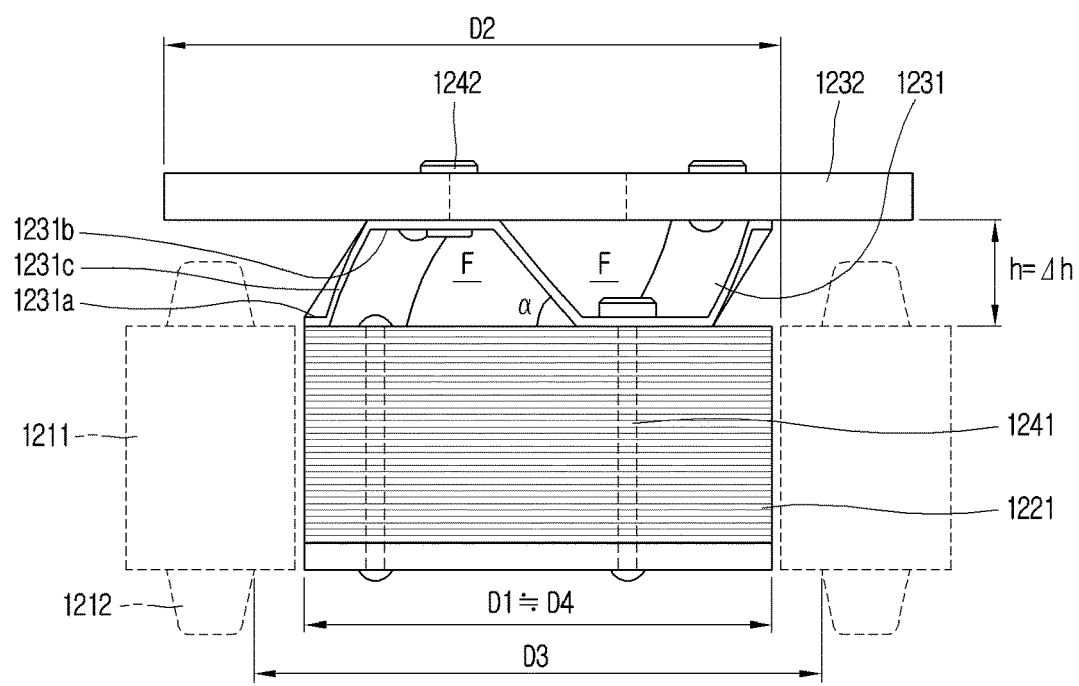
FIG. 5 is a front view of FIG. 4.

FIG. 3 is an exploded perspective view illustrating examples of an inertial core and a rotor, FIG. 4 is a perspective view illustrating an example of a coupled state of the inertial core and the rotor, and FIG. 5 is a front view of FIG. 4.

Referring back to FIG. 2, the rotor 122 can include the rotor core 1221 and the permanent magnets 1222 as described above. One shaft hole 1221*a* to which the rotating shaft 130 is press-fitted can be defined at the center of the rotor core 1221, and a plurality of magnet mounting holes 1221*b* in which the respective permanent magnets 1222 are inserted can be formed at the edge of the rotor core 1221.

The shaft hole 1221*a* and the magnet mounting holes 1221*b* can be formed through the rotor core 1221 in the axial direction, and the plurality of magnet mounting holes 1221*b* can be formed at the edge of the rotor core 1221 to be spaced apart by predetermined intervals in the circumferential direction.

The shaft hole 1221*a* can have a circular cross-sectional shape to correspond to an outer surface of the rotating shaft 130, and the magnet mounting hole 1221*b* can have a rectangular cross-sectional shape to correspond to an outer surface of the permanent magnet 1222.

The rotor core 1221 can be formed by stacking a plurality of thin electrical steel sheets in the axial direction. For example, a first coupling hole 1221*c* is formed through the rotor core 1221 in the axial direction, and a first coupling member 1241, such as a bolt and a rivet, is inserted into the first coupling hole 1221*c* so that the plurality of electrical steel sheets can be stacked together. The first coupling hole 1221*c* can be provided in plurality to be disposed between the shaft hole 1221*a* and the magnet mounting holes 1221*b* at predetermined intervals in the circumferential direction.

In addition, the rotor core 1221 can be formed by stacking thin electrical steel sheets having the same shape in the axial direction, such that the rotor core 1221 can have the same shape in the axial direction. Alternatively, the rotor core 1221 can be formed by stacking thin electrical steel sheets having different shapes, such that the rotor core 1221 can have different shapes in the axial direction.

For example, the rotor core 1221 can be formed in a shape having one outer diameter, or a shape having a plurality of outer diameters in the axial direction. The former can be referred to as a "single-stage rotor core" and the latter can be referred to as a "multi-stage rotor core." In some implementations, the single-stage rotor core is used as a representative example, but the basic structure can be equally applied to the multi-stage rotor core. Hereinafter, the rotor core can be understood as the single-stage rotor core unless otherwise specified.

In some implementations, the inertial core 1232 can be provided at one end of the rotor 122 in the axial direction, more precisely, at one end of the rotor core 1221 in the axial direction. In detail, the inertial core 1232 can be installed at an upper or lower end of the rotor core 1221, or both the upper and lower ends of the rotor core 1221 according to the shape of a compressor in which the electric motor 120 is installed. Herein, an example in which the inertial core 1232 is installed at the upper end of the rotor core 1221 will be described.

Referring to FIGS. 3 to 5, the inertial core 1232 can be coupled to the upper end of the rotor core 1221 with the connection part 1231 interposed therebetween.

The connection part 1231 is a part that is coupled to the rotor core 1221, and the inertial core 1232 is a part that is spaced apart from the rotor core 1221. A horizontal cross-sectional area at a middle height (or point) of the connection part 1231 in the axial direction can be smaller than a horizontal cross-sectional area at a middle height of the rotor core 1221 in the axial direction, and a horizontal cross-sectional area at a middle height of the inertial core 1232 in the axial direction can be larger than the horizontal cross-sectional area at the middle height of the rotor core 1221 in the axial direction. Accordingly, an amount of use of the connection part 1231 can be reduced, a contact area between the connection part 1231 and the permanent magnets 1222 can be reduced, and a fluid flow path F to be described hereinafter can be provided in the connection part 1231 by providing communication between the inside and the outside of the connection part 1231 or reducing the horizontal cross-sectional area.

The connection part 1231 and the inertial core 1232 can be formed as a single body, or separately formed and assembled together. When the connection part 1231 and the inertial core 1232 are formed as a single body, it can be advantageous in terms of assemblability, and when the connection part 1231 and the inertial core 1232 are separately provided, it can be advantageous in terms of manufacturing cost and magnetic flux leakage reduction. In some implementations, the connection part 1231 and the inertial core 1232 can be separately formed, which will be described. In some implementations, the connection part 1231 and the inertial core 1232 can be formed as a single body, which will be described later.

In some implementations, the connection part 1231 and the inertial core 1232 can have the same property or different properties with respect to a magnetic property. When both the connection part 1231 and the inertial core 1232 are non-magnetic, it can be suitable for suppressing magnetic flux leakage. On the other hand, when both of the connection part 1231 and the inertial core 1232 are magnetic, it can be advantageous in terms of manufacturing costs. In some implementations, the connection part 1231 can be made of a non-magnetic material, and the inertial core 1232 can be made of a magnetic material, which will be described. In some implementations, both the connection part 1231 and the inertial core 1232 can be made of magnetic materials, which will be described later.

Figure 6:
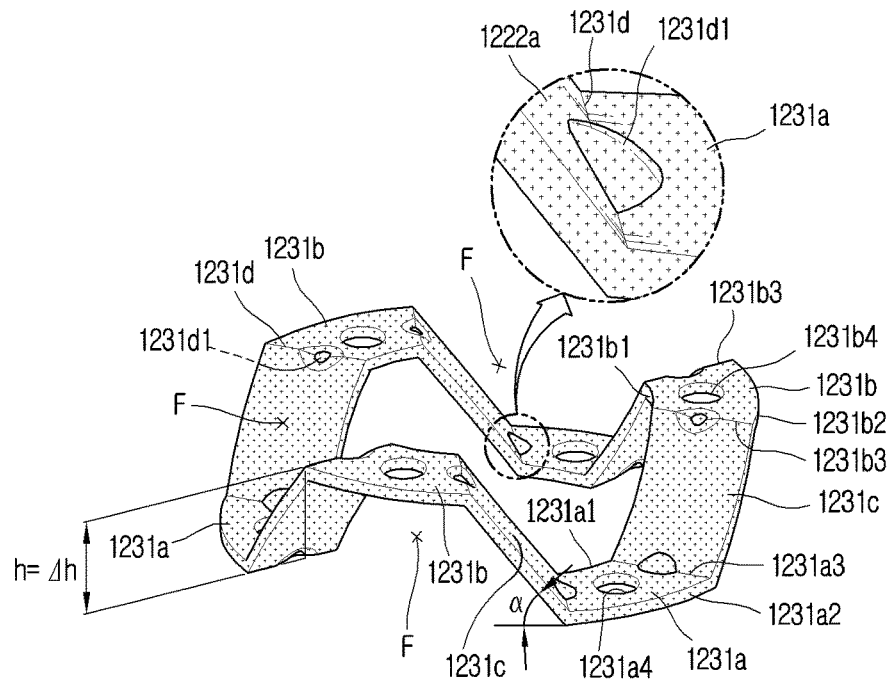
FIG. 6 is an enlarged perspective view illustrating an example of a connection part of FIG. 3.
Figure 7:
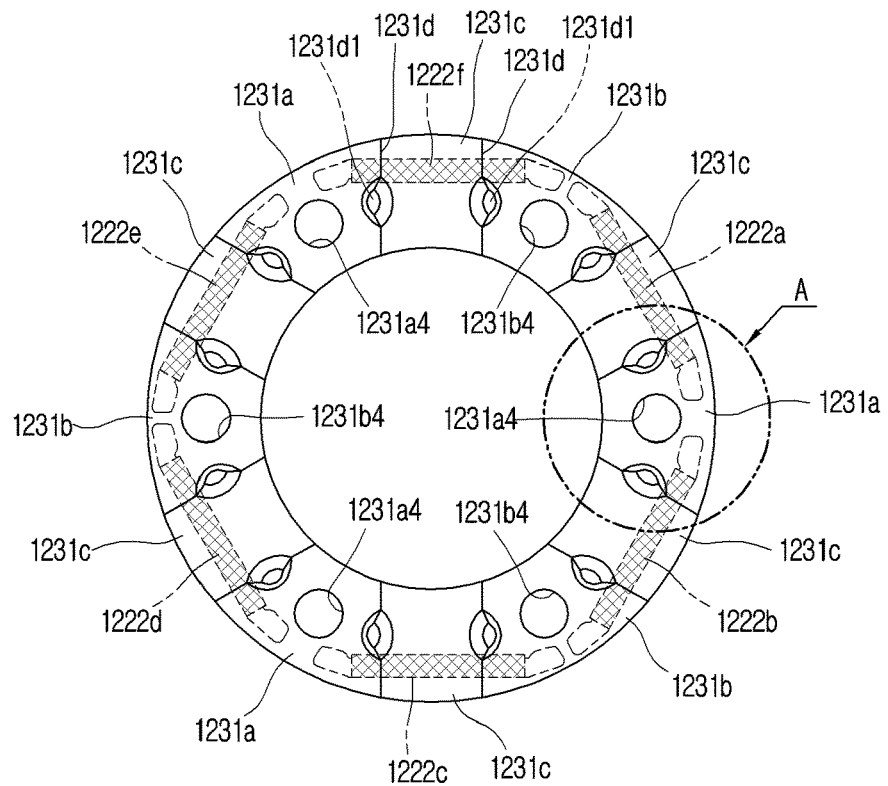
FIG. 7 is a planar view of FIG. 6.
Figure 8:
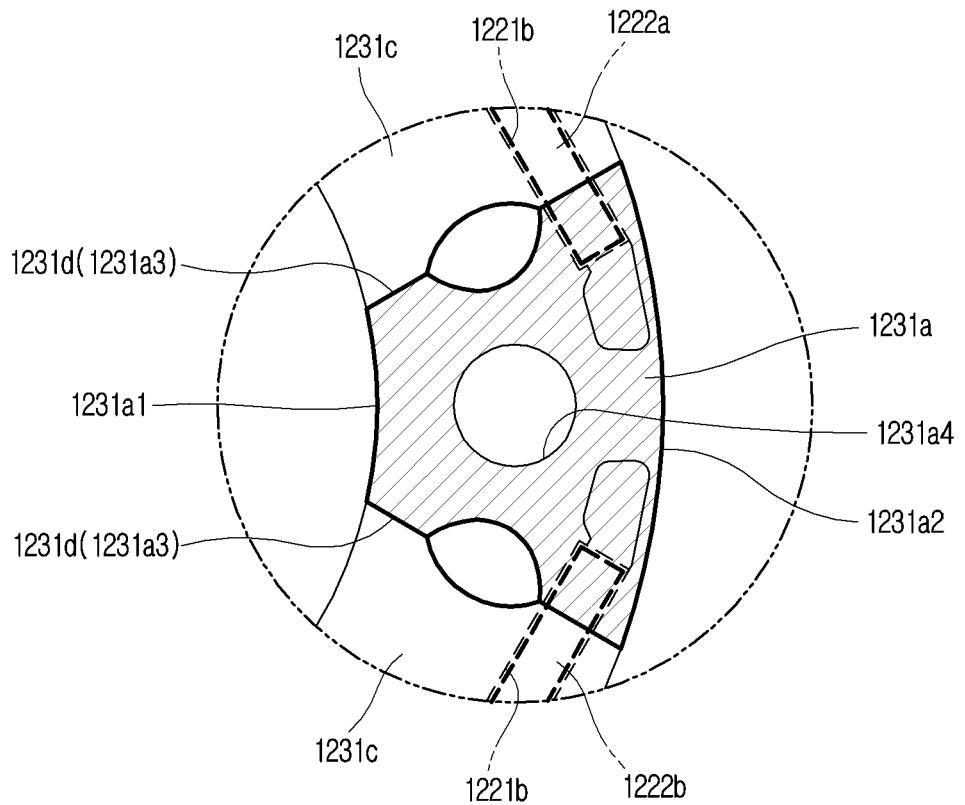
FIG. 8 is an enlarged planar view illustrating a portion "A" of FIG. 7.

FIG. 6 is an enlarged perspective view illustrating an example of a connection part of FIG. 3, FIG. 7 is a planar view of FIG. 6, and FIG. 8 is an enlarged planar view illustrating a portion "A" of FIG. 7.

Referring to FIGS. 6 to 8, the connection part 1231 can be configured as a single body with an annular shape. The connection part 1231 can be formed in a wavy or zigzag shape along the circumferential direction.

For example, the connection part 1231 can include a plurality of first fixing portions 1231a, a plurality of second fixing portions 1231b, and a plurality of link portions 1231c. The plurality of first fixing portions 1231a and the plurality of second fixing portions 1231b can be alternately disposed along the circumferential direction when projected in the axial direction, and the plurality of link portions 1231c can be inclined opposite to each other when projected in the radial direction. Hereinafter, one first fixing portion 1231a, one second fixing portion 1231b, and one link portion 1231c will be used as representative examples for description.

The first fixing portion 1231a that is supported on an axial end surface of the rotor core 1221 (or an end surface of the rotor core 1221 in the axial direction) can be flat when projected in the radial direction. Accordingly, the first fixing portion 1231a can be securely supported on the end surface of the rotor core 1221 in the axial direction.

In detail, the first fixing portion 1231a can include a first inner arcuate end portion 1231a1, a first outer arcuate end portion 1231a2, and a plurality of first linear end portions connecting both ends of the first inner arcuate end portion 1231a1 and both ends of the first outer arcuate end portion 1231a2 facing each other. Accordingly, the first fixing portion 1231a can have a sectoral shape in which an arc length of its outer circumferential surface is greater (longer) than an arc length of its inner circumferential surface when projected in the axial direction.

The first fixing portion 1231a can be formed such that a radial center line passes through its circumferential center to pass through a center of the rotating shaft 130, namely a center of the rotor 122. Accordingly, centrifugal force acting on the first fixing portion 1231a can be evenly distributed, allowing the first fixing portion 1231a to be securely supported on the rotor core 1221.

In some implementations, one axial surface (e.g., a lower surface) of the first fixing portion 1231a can be formed to correspond to an axial end surface (e.g., an upper surface) of the rotor core 1221 that faces the first fixing portion 1231a in the axial direction. For example, the lower surface of the first fixing portion 1231a can be formed flat like the upper surface of the rotor core 1221. As a contact area between the connection part 1231 and the rotor core 1221 is secured, the connection part 1231 can be securely supported on the rotor core 1221.

In addition, the plurality of first fixing portions 1231a can have the same arc angle along the circumferential direction. In other words, the plurality of first fixing portions 1231a can be disposed at equal intervals in the circumferential direction. This can allow a circumferential support force of the connection part 1231 to be evenly distributed, and thus, the connection part 1231 can be securely supported on the rotor core 1221.

The first fixing portion 1231a can be provided at a position where at least a portion or part thereof radially overlaps one axial end (upper end) of the permanent magnet 1222. In other words, when the number of permanent magnets 1222 is greater than the number of first fixing portions 1231a as in this implementation, each of the first fixing portions 1231a can be disposed over ends of two permanent magnets 1222 facing each other in the circumferential direction, which can be suitable for fixing the permanent magnets 1222.

For example, as illustrated in FIG. 7, six permanent magnets 1222 and three first fixing portions 1231a can be provided. When a left end in the drawing is referred to as a "first end," and a right end in the drawing is referred to as a "second end," one fixing portion 1231a can be disposed in a radially overlapping manner over a second end (right end in the drawing) of a first permanent magnet 1222a and a first end (left end in the drawing) of a second permanent magnet 1222b facing each other in the circumferential direction. Another first fixing portion 1231a can be disposed in a radially overlapping manner over a second end of a third permanent magnet 1222c and a first end of a fourth permanent magnet 1222d facing each other in the circumferential direction. The other first fixing portion 1231a can be disposed in a radially overlapping manner over a second end of a fifth permanent magnet 1222e and a first end of a sixth permanent magnet 1222f facing each other in the circumferential direction. Accordingly, a circumferential center of each of the three first fixing portions 1231a can be disposed between two adjacent permanent magnets 1222 to thereby cover and support the two permanent magnets 1222 in the axial direction. Thus, one axial ends (upper ends) of the six permanent magnets 1222 can be covered and supported in the axial direction by the three first fixing portions 1231a.

In some examples, a second coupling hole 1231a4 can be defined in a central part of the first fixing portion 1231a to be disposed at a position that does not overlap the permanent magnet 1222, for example, on the same axis as the first coupling hole 1221c of the rotor core 1221. Accordingly, the connection part 1231 can be coupled by the first coupling member 1241 that passes through the second coupling hole 1231a4 and the first coupling hole 1221c.

Referring to FIGS. 6 to 8, the second fixing portion 1231b, which is a part supported on the inertial core 1232, can be formed flat when projected in the radial direction. Accordingly, the second fixing portion 1231b can be securely supported on the inertial core 1232.

One axial surface (upper surface) of the second fixing portion 1231b facing the inertial core 1232 can be formed to correspond to one axial surface (lower surface) of the inertial core 1232. For example, the upper surface of the second fixing portion 1231b can be formed flat the same as a lower surface of the inertial core 1232. In some examples, a rotation prevention groove in which the second fixing portion 1231b is inserted to be supported in the circumferential direction can be formed on the lower surface of the inertial core 1232.

The second fixing portion 1231b can include a second inner arcuate end portion 1231b1, a second outer arcuate end portion 1231b2, and a plurality of second linear end portions 1231b3 connecting both ends of the second inner arcuate end portion 1231b1 and both ends of the second outer arcuate end portion 1231b2. Accordingly, the second fixing portion 1231b can have a sectoral shape in which an arc length of its outer circumferential surface is greater (longer) than an arc length of its inner circumferential surface when projected in the axial direction.

An area of the second fixing portion 1231b can be substantially the same as an area of the first fixing portion 1231a. Accordingly, the inertial core 1232 supported on the second fixing portion 1231b can be securely supported.

As described above, the second fixing portion 1231b can be formed between two first fixing portions 1231a along the circumferential direction when projected in the axial direction. The plurality of second fixing portions 1231b can be disposed at equal intervals to have the same arc angle in the circumferential direction. Accordingly, a circumferential support force of the connection part 1231 is evenly distributed to thereby securely support the inertial core 1232.

A third coupling hole 1231b4 is formed at each of the second fixing portions 1231b. The third coupling hole 1231b4 can be disposed on the same axis as a fourth coupling hole 1232d of the inertial core 1232 to be described hereinafter.

Referring to FIGS. 6 to 8, the link portion 1231c is a portion that connects the first fixing portion 1231a and the second fixing portion 1231b. The plurality of link portions 1231c can be bent opposite to each other along the circumferential direction when projected in the radial direction.

For example, when a left end in the drawing is referred to as a "first end," and a right end in the drawing is referred to as a "second end," one first link portion 1231c can be bent upward from a second end (left end in the drawing) of one first fixing portion 1231a located on the lower side in the axial direction to a first end (right end in the drawing) of one second fixing portion 1231b located on the upper side in the axial direction, and another link portion 1231c can be bent downward from a second end of the one second fixing portion 1231b to a first end of another first fixing portion 1231a. Accordingly, the link portions 1231c can be formed in a wavy or zigzag shape in the circumferential direction.

Each of the link portions 1231c can be bent at a right angle. For example, one link portion 1231c can be bent at a right angle from a second end of one first fixing portion 1231a to be connected to a first end of one second fixing portion 1231b, and another link portion 1231c can be bent at a right angle from a second end of the one second fixing portion 1231b to be connected to a first end of another first fixing portion 1231a. Then, as the first fixing portions 1231a and the second fixing portions 1231b are arranged continuously in the circumferential direction when projected in the axial direction, support areas of the first fixing portions 1231a and the second fixing portions 1231b can be increased and axial support forces of the link portions 1231c can be enhanced when the inertial core 1232 is coupled to the rotor core 1221 in the axial direction.

In some examples, the link portions 1231c can be obliquely or inclinedly bent in alternatively opposite directions along the circumferential direction. For example, one link portion 1231c can be obliquely bent from a second end of one first fixing portion 1231a to be connected to a first end of one second fixing portion 1231b, and another link portion 1231c can be obliquely bent from a second end of the one second fixing portion 1231b to be connected to a first end of another first fixing portion 1231a. As the first fixing portions 1231a and the second fixing portions 1231b are disposed at predetermined intervals in the circumferential direction when projected in the axial direction, the amount of use of the connection part 1231 can be reduced accordingly. This is advantageous to reduce manufacturing costs considering that the connection part 1231 is a relatively expensive non-magnetic material. In some implementations, the link portions 1231c can be bent, curved, or inclined.

The link portion 1231c can be formed in an arcuate shape having both side surfaces in the circumferential direction parallel to each other when projected in the axial direction. Accordingly, outer and inner circumference lengths of the link portion 1231c that connects the first fixing portion 1231a and the second fixing portion 1231b can be the same, and thus, outer circumferential heights and inner circumferential heights of the first fixing portion 1231a and the second fixing portion 1231b can be the same.

Referring back to FIG. 5, the link portion 1231c defines a gap or distance Δh between the first fixing portion 1231a and the second fixing portion 1231b as described above. In other words, a slope a of the link portion 1231c determines an axial height h of the link portion 1231c, and the axial height h of the link portion 1231c determines the distance Δh between the first fixing portion 1231a and the second fixing portion 1231b. Therefore, the larger the slope a of the link portion 1231c, the greater the distance Δh between the first fixing portion 1231a and the second fixing portion 1231b.

This can allow the magnetic inertial core 1232 to be farther away from the permanent magnet 1222 inserted into the rotor core 1221, which can be suitable for suppressing magnetic flux leakage through the inertial core 1232. Thus, the gap Δh between the first fixing portion 1231a and the second fixing portion 1231b can also be referred to as an "insulation distance."

More specifically, the slope a of the link portion 1231c can be formed such that the insulation distance (a height of the link portion, a height of the connection part, or a height of the non-magnetic material) Δh between the first fixing portion 1231a and the second fixing portion 1231b can be greater than or equal to an axial length (thickness) t of the inertial core 1232 to be described hereinafter.

This is to avoid interference between the inertial core 1232 that extends more radially outward than an inner circumferential surface of the stator coil 1212 and the stator coil 1212 that protrudes from the stator core 1211 in the axial direction. When the inertial core 1232 to be described hereinafter is located more inward than the stator coil 1212, the insulation distance Δh can be less than a thickness t of the inertial core 1232. However, even in this case, an appropriate insulation distance Δh between the inertial core 1232 and the permanent magnet 1222 can be provided to suppress magnetic flux leakage.

Figure 9:
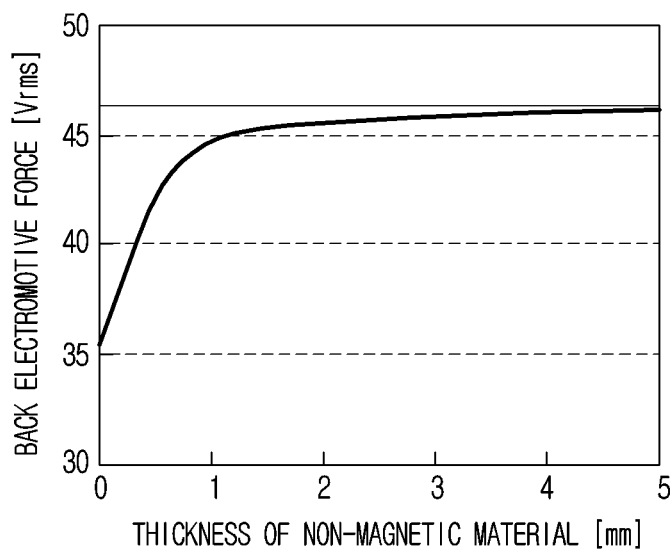
FIG. 9 is a graph showing an example of back electromotive force according to heights of a first inertial core.

The table below shows the result of an experiment of correlation between no-load back electromotive force (BEMF) and a height (or thickness) of the connection part 1231, which is a non-magnetic material. FIG. 9 is a graph showing this relationship.

TABLE 1

| Height of non-magnetic material (mm) | Back electromotive force (BEMF) | Reduction rate of BEMF (%) |
| --- | --- | --- |
| 0 | 34.44 | 74.3 |
| 1 | 44.05 | 95.0 |
| 2 | 44.95 | 97.0 |
| 3 | 45.76 | 98.7 |
| 4 | 46.01 | 99.3 |
| 5 | 46.04 | 99.3 |
| 6 | 46.17 | 99.6 |

As shown in the [Table 1] above and FIG. 9, it can be seen that a reduction rate of BEMF is about 0.7% when the height of the non-magnetic material is 4 mm, and a reduction rate of BEMF is greatly increased to be approximately 1.3% when the height of the non-magnetic material is 3 mm. Therefore, the height (insulation distance) h of the connection part 1231, which is the non-magnetic material, should be less than or equal to the thickness t of the inertial core 1232, which is the magnetic material, and should be approximately 4 mm or more in order to suppress magnetic flux leakage. To this end, the slope of the link portion 1231c can be greater than or equal to 20° (degrees) and less than 90° (degrees) with respect to an end surface of the rotor core 1221 in the axial direction (or an axial end surface of the rotor core 1221).

As the connection part 1231 according to the present disclosure is formed by bending a thin plate, the connection part 1231 can have a horizontal cross-sectional area smaller than a horizontal cross-sectional area of the rotor core 1221.

In some examples, a fluid flow path F can be provided between the rotor core 1221 and the inertial core 1232 as the inside and outside of the connection part 1231 communicates with each other. Accordingly, a fluid in a periphery of the connection part 1231 can flow through the fluid flow path F when the rotor 122 rotates, allowing fluid resistance generated in the periphery of the connection part 1231 and the inertial core 1232 to be reduced when the rotor 122 rotates. As a result, a decrease in efficiency of the motor can be suppressed.

As both side surfaces of the link portion 1231c in the circumferential direction are parallel to each other when projected in the axial direction, the link portion 1231c, as illustrated in FIG. 8, can be inclined with respect to the circumferential direction when projected in the axial direction. When the connection part 1231 rotates together with the rotor 122, fluid resistance in the link portion 1231c can be reduced to thereby more effectively suppress a decrease in the motor efficiency.

In some implementations, bending line portions 1231d can be formed between the first fixing portion 1231a and the link portion 1231c, and between the link portion 1231c and the second fixing portion 1231b, respectively. The bending line portions 1231d define the first linear end portion 1231a3 or the second linear end portion 1231b3 defining both ends of the first fixing portion 1231a or the second fixing portion 1231b. Accordingly, each of the link portions 1231c can be upwardly or downwardly bent from the first fixing portion 1231a or the second fixing portion 1231b with respect to the bending line portion 1231d defining the first fixing portion 1231a or the second fixing portion 1231b.

Referring to FIGS. 6 and 7, the bending line portion 1231d can be provided with a reinforcing rib 1231d1 to help to prevent a decrease in strength due to stress concentration in the bending line portion 1231d.

The reinforcing rib 1231d1 can protrude from a center of the bending line portion 1231d in a direction in which the link portion 1231c is bent, namely, to an inner surface of the bending line portion 1231d. This can help to prevent buckling of the relatively thin link portion 1231c due to a coupling force caused when the inertial core 1232 is coupled to the rotor core 1221 or deformation of the link portion 1231c caused by centrifugal force generated when the rotor 122 rotates. Accordingly, rigidity of the bending line portion 1231d can be increased to thereby enhance the reliability of the connection part 1231.

The reinforcing rib 1231d1 can pass through the bending line portion 1231d in the circumferential direction such that its one end is connected to the first fixing portion 1231a or the second fixing portion 1231b and its another end is connected to the link portion 1231c.

As the connection part 1231 is formed in a wavy or zigzag shape by pressing a thin plate material, the reinforcing rib 1231d1 can be formed together while the connection part 1231 is pressing processed. Accordingly, the reinforcing rib 1231d1 can be recessed by being pressed from an outer surface to inner surface of the bending line portion 1231d.

In some examples, this can be achieved when the connection part 1231 is made of a material having plasticity such as stainless steel, and the reinforcing rib 1231d1 can be formed in various ways depending on the material of the connection part 1231. For example, when the connection part 1231 has elasticity such as plastic, the outer surface of the bending line portion 1231d can be formed flat and the reinforcing rib 1231d1 can protrude only to the inner surface of the bending line portion 1231d.

In some examples, the reinforcing rib 1231d1 can be provided at the center of the bending line portion 1231d, and a length of the reinforcing rib 1231d1 in a widthwise direction can be approximately less than half of a length of the bending line portion 1231d in the widthwise direction in consideration of stability, which can be more advantageous in terms of strength.

Referring back to FIGS. 3 to 5, the inertial core 1232 can have an annular shape, and be coupled by being supported on the upper surfaces of the second fixing portions 1231b of the connection part 1231.

The inertial core 1232 can be made of a magnetic material as described above. For example, the inertial core 1232 can be made of steel or a similar material. The inertial core 1232 made of the magnetic material can be inexpensive and have a higher density compared to an inertial core entirely made of a non-magnetic material to thereby increase rotational inertia (moment of inertia) in relation to a cross-sectional area of the inertial core 1232.

A bearing portion through hole 1232b can be formed through a center of a body portion 1232a of the inertial core 1232. The bearing portion through hole 1232b can be a hole through which a bearing portion 1413 of the main bearing 141 penetrates in the axial direction, and its center can be located on the same axis as a rotation center of the rotating shaft 130 (a rotation center of the rotor). Accordingly, the body portion 1232a of the inertial core 1232 can produce a uniform centrifugal force along the radial direction when the rotor 122 rotates.

The bearing portion through hole 1232b can be formed in a circular shape having one inner diameter. In some examples, when the connection part 1231 and the inertial core 1232 are assembled together before coupling the connection part 1231 to the rotor core 1221, the second coupling hole 1231a4 of the connection part 1231 and the first coupling hole 1221c of the rotor core 1221 are covered or blocked by a peripheral portion of the bearing portion through hole 1232b. Then, the first coupling member 1241 cannot be inserted from the inertial core 1232 into the rotor core 1221.

In some implementations, coupling member insertion grooves 1232c can extend to be recessed into an inner circumferential surface of the bearing portion through hole 1232b in the radial direction. The coupling member insertion groove 1232c can be formed on the same axis as the second coupling hole 1231a4 of the connection part 1231 and the first coupling hole 1221c of the rotor core 1221 when projected in the axial direction. Accordingly, when the connection part 1231 and the inertial core 1232 are assembled together prior to assembling the connection part 1231 to the rotor core 1221, the first coupling member 1241 can be inserted from the inertial core 1232 into the rotor core 1221 through the coupling member insertion groove 1232c.

In some examples, the fourth coupling hole 1232d can be formed on the body portion 1232a of the inertial core 1232. For example, a plurality of fourth coupling holes 1232d can be defined in a periphery of the bearing portion through hole 1232b to be spaced apart by predetermined intervals in the circumferential direction. More specifically, the fourth coupling holes 1232d can be formed on the same circumference as the coupling member insertion grooves 1232c to be disposed at equal intervals between the coupling member insertion grooves 1232c so as not to overlap the coupling member insertion grooves 1232c.

The fourth coupling hole 1232d can be formed on the same axis as the third coupling hole 1231b4 such that the connection part 1231 and the inertial core 1232 can be coupled by a second coupling member 1242 passing through the fourth coupling hole 1232d and the third coupling hole 1231b4.

The number of the fourth coupling holes 1232d can correspond to the number of the first coupling holes 1221c. In some implementations, the fourth coupling holes 1232d of the inertial core 1232 can be formed only in portions corresponding to the third coupling holes 1231b4 of the connection part 1231.

In order to increase centrifugal force, the inertial core 1232 can be formed as wide as possible, which is advantageous in terms of rotational inertia. For example, an outer diameter of the inertial core 1232 can be greater than an air gap between the stator 121 and the rotor 122.

Referring back to FIG. 5, an outer diameter D2 of the inertial core 1232 can be greater than an inner diameter D3 of the stator coil 1212 (more precisely, a bundle of coils wound on an upper end of the stator core 1211 into an annular shape) such that a portion of the inertial core 1232 overlaps the stator coil 1212 in the radial direction. Accordingly, the outer diameter D2 of the inertial core 1232 can be much greater than an outer diameter D4 of the rotor core 1221. However, an outer diameter D1 of the connection part 1231 can be less than the outer diameter D2 of the inertial core 1232, and substantially the same as the outer diameter D4 of the rotor core 1221.

As described above, by forming the thickness t of the inertial core 1232 as thin as possible to make the inertial core 1232 farther away from the permanent magnet 1222 as possible, magnetic flux leakage of the permanent magnet 1222 can be suppressed.

At the same time, centrifugal force of the inertial core 1232 can be enhanced by increasing the outer diameter D2 of the inertial core 1232. Accordingly, rotational inertia of the inertial core 1232 can be increased to thereby suppress a decrease in efficiency of the motor and the compressor while reducing the size of the electric motor.

In some implementations, a volume of the inertial core 1232 can be determined by rotational inertia of the rotor 122 excluding the connection part 1231 and the inertial core 1232. In other words, rotational inertia of a rotating body including the rotor 122, the connection part 1231, and the inertial core 123 is related to efficiency of the compressor. If the rotational inertia of the rotating body is too low or too high, the efficiency of the compressor can be reduced. Therefore, a range of the rotational inertia of the rotating body should be appropriately secured (or determined) for the efficiency of the compressor.

Since the rotational inertia of the rotor 122 is predetermined by the size (capacity) of the electric motor 120, the rotational inertia of the inertial core 1232 (or the connection part included) can be a value obtained by subtracting rotational inertia of the rotor 122 from appropriate rotational inertia of the rotating body.

Figure 10:
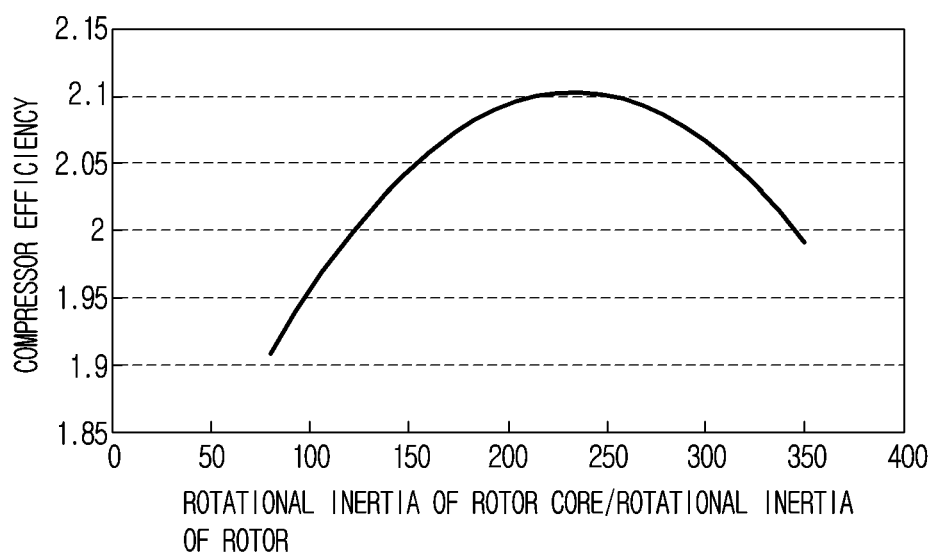
FIG. 10 is a graph showing an example of a compressor efficiency with respect to rotational inertia of a rotor including an inertial core.

FIG. 10 is a graph showing the compressor efficiency with respect to rotational inertia of a rotor including an inertial core.

Referring to FIG. 10, an x-axis represents a ratio calculated by dividing rotational inertia of the inertial core 1232 (or including the connection part) by rotational inertia of the rotor 122, and a y-axis indicates the efficiency of the compressor. The graph shows that the rotational inertia of the inertial core 1232 should be greater than the rotational inertia of the rotor 122, and the ratio calculated by dividing the rotational inertia of the inertial core 1232 by the rotational inertia of the rotor 122 should be in the range of 110 to 300%.

Hereinafter, a description will be given of an example of an inertial core.

That is, in the example described above, the connection part is bent in the zigzag shape such that portions supporting the inertial core are spaced apart from the rotor core. However, in some cases, the portions supporting the inertial core can be supported on the rotor core in the axial direction while being bent into the zigzag shape.

Figure 11:
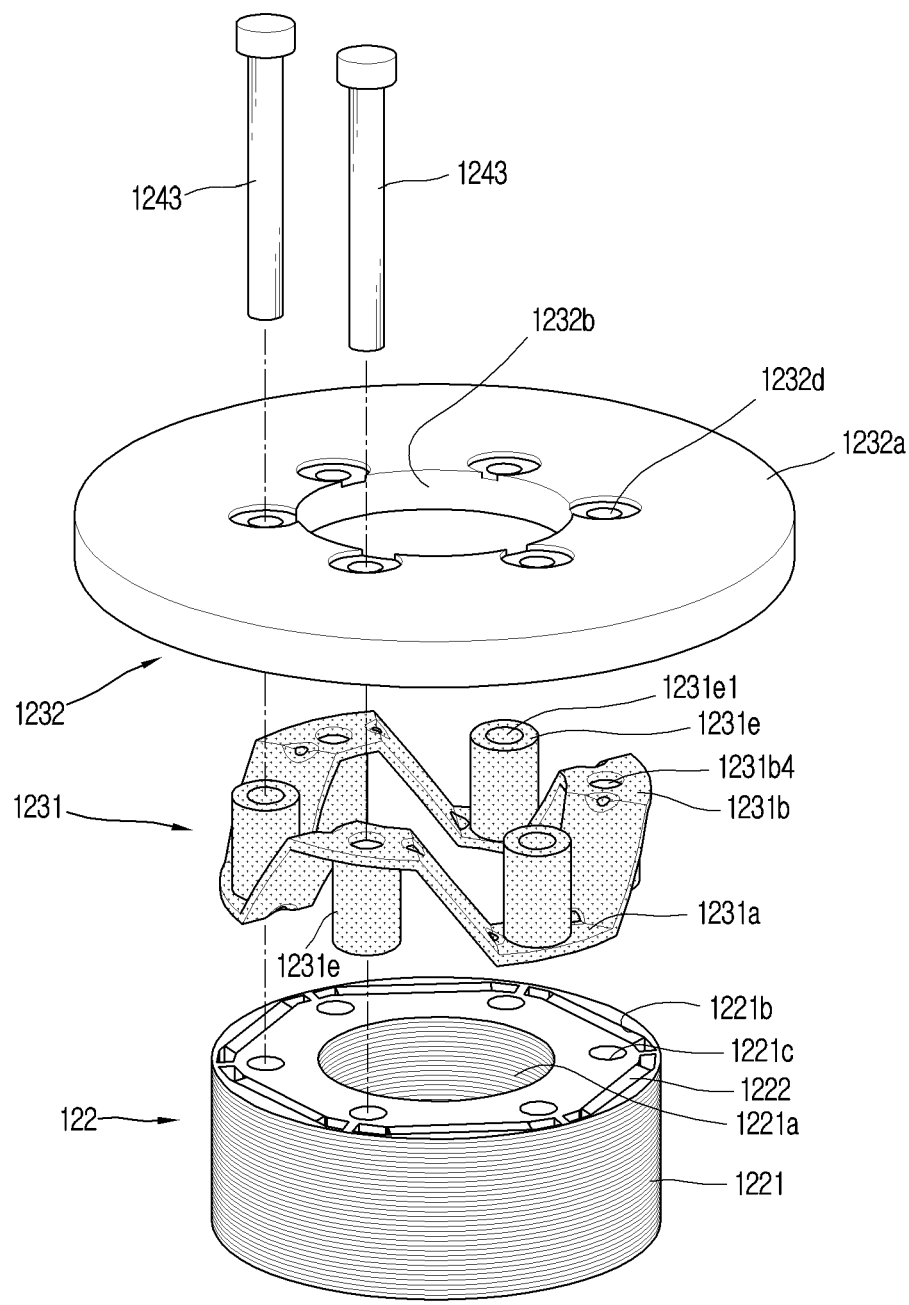
FIG. 11 is an exploded perspective view illustrating an example of an inertial core.
Figure 12:
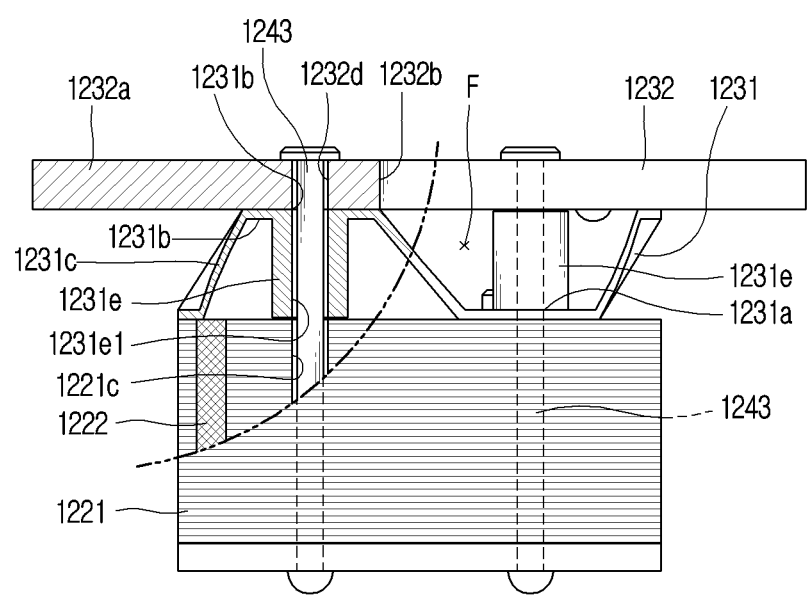
FIG. 12 is an assembled front view of FIG. 11.

FIG. 11 is an exploded perspective view illustrating an example of an inertial core, and FIG. 12 is an assembled front view of FIG. 11.

Referring to FIGS. 11 and 12, a connection part 1231 can be coupled to an inertial core 1232 as described above. The connection part 1231 can be formed in a wavy or zigzag shape, and the inertial core 1232 can be implemented as a flat plate with an annular shape.

In detail, the connection part 1231 can include a plurality of first fixing portions 1231a, second fixing portions 1231b, and link portions 1231c as described above. The first fixing portions 1231a and the second fixing portions 1231b can be connected to each other by the link portions 1231c so as to have an annular shape.

The first fixing portions 1231a can be supported on the rotor core 1221, the second fixing portions 1231b can be supported on the inertial core 1232, and the link portions 1231c can be obliquely bent to connect the first fixing portions 1231a and the second fixing portions 1231b.

The basic configurations of the first fixing portion 1231a, the second fixing portion 1231b, and the link portion 1231c are similar to those of the example described above, so a detailed description thereof will be omitted. In this example, however, boss portions 1231e extending from the first fixing portions 1231a and/or the second fixing portions 1231b in the axial direction can be further provided.

The boss portion 1231e can extend from the connection part 1231 or the inertial core 1232. However, when the boss portion 1231e extends from the inertial core 1232 that is magnetic, magnetic flux leakage can be caused as the boss portion 1231e of a magnetic material is disposed adjacent to the permanent magnet 1222. Therefore, the boss portion 1231e can extend from the connection part 1231, which is non-magnetic, and help to prevent the magnetic flux leakage.

In some implementations, the boss portions 1231e can extend from the first fixing portions 1231a toward the inertial core 1232, or extend from the second fixing portions 1231b toward the rotor core 1221. However, in this implementation, an example in which the boss portions 1231e extend from both of the first fixing portions 1231a and the second fixing portions 1231b will be described.

Referring to FIGS. 11 and 12, the boss portions 1231e can axially extend from the first fixing portion 1231a and the second fixing portion 1231b of the connection part 1231, respectively. A fifth coupling hole 1231e1 can be formed through each of the boss portions 1231e in the axial direction. The fifth coupling hole 1231e1 can be formed on the same axis as the first coupling hole 1221c of the rotor core 1221, the second coupling hole 1231a4 of the first fixing portion 1231a (or the third coupling hole of the second fixing portion), and the fourth coupling hole 1232d of the inertial core 1232 in a communicating manner.

A length of the boss portion 1231e can be approximately equal to a value obtained by subtracting a thickness of the first fixing portion 1231a (or the second fixing portion) from a height of the link portion 1231c, namely, a height of the connection part 1231. Accordingly, an upper end of the boss portion 1231e that extends from an upper surface of the first fixing portion 1231a can have substantially the same height as an upper surface of the second fixing portion 1231b, and a lower end of the boss portion 1231e that extends from a lower surface of the second fixing portion 1231b can have substantially the same height as a lower surface of the first fixing portion 1231a.

Since the inertial core 1232 in this example is almost the same as the inertial core of the example described above, a detailed description thereof will be omitted. However, in this implementation, as the fifth coupling hole 1231e1 is defined in each of the boss portions 1231e of the connection part 1231, a bearing portion through hole 1232b with a circular shape can be formed at the center of the inertial core 1232.

As such, when the boss portion 1231e extends from the connection part 1231 in the axial direction, the boss portion 1231e can axially support the connection part 1231 with respect to the rotor core 1221. Accordingly, buckling of the connection part 1231 can be suppressed to thereby increase the reliability of the connection part 1231 and the inertial core 1232. In particular, buckling of the connection part 1231, which can be caused when the connection part 1231 is made of a non-metal such as plastic, can be effectively prevented.

In some examples, when the inertial core 1232 is coupled to the rotor core 1221 by third coupling members 1243 penetrating from an upper end of the inertial core 1232 to the lower end of the rotor core 1221, buckling of the connection part 1231 can be caused by a coupling force applied when coupling the coupling member 1243. This can be caused more when the connection part 1231 is a non-metal. However, as in this implementation, when the boss portion 1231e is provided at the connection part 1231, the buckling of the connection part 1231 can be effectively suppressed even when the third coupling members 1243 are coupled through the rotor core 1221 and the inertial core 1232 entirely in the axial direction.

In this case, an inner circumferential surface of the inertial core 1232 can be formed in a circular shape to thereby achieve a simpler structure of the inertial core 1232. This can result in facilitating the manufacture of the inertial core 1232, and increasing weight of the inertial core 1232 in relation to its outer diameter, which is advantageous to increase rotational inertia.

As the third coupling member 1243 passes through both the inertial core 1232 and the connection part 1231 to be coupled to the rotor core 1221, the rotor core 1221 and the inertial core 1232 can be coupled by the same third coupling member 1243. Accordingly, coupling of the rotor core 1221 and the inertial core 1232 can be simplified to thereby reduce manufacturing costs.

In some examples, as the boss portion 1231e extends from the connection part 1231 in the axial direction and is spaced apart from the adjacent link portion 1231c, a fluid flow path F can be formed between the link portions 1231c of the connection part 1231 as in the example described above. Accordingly, fluid resistance caused by the connection part 1231 and the inertial core 1232 when the rotor 122 rotates can be reduced while allowing the inertial core 1232 to be installed on the rotor 122.

Although not shown in the drawings, the boss portions can be separated from the connection part and manufactured separately. Its basic structure and operational effects are similar to those of the example described above, a detailed description thereof will be omitted.

Hereinafter, a description will be given of an example of an inertial core.

That is, in the examples described above, the connection part has the annular shape and is bent in the zigzag shape. However, in some cases, the connection part can have a boss shape extending in the axial direction.

Figure 13:
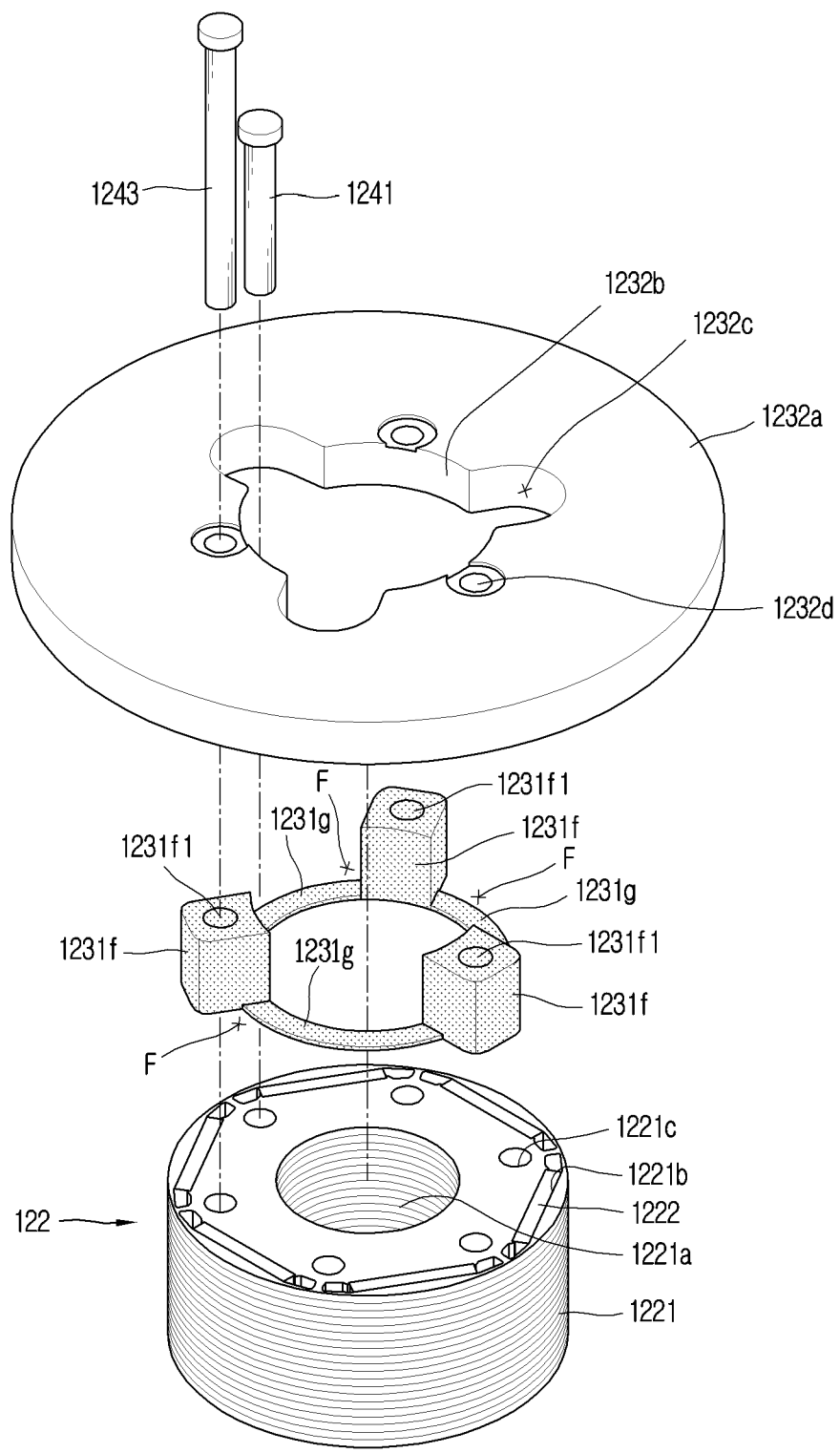
FIG. 13 is an exploded perspective view illustrating an example of an inertial core.
Figure 14:
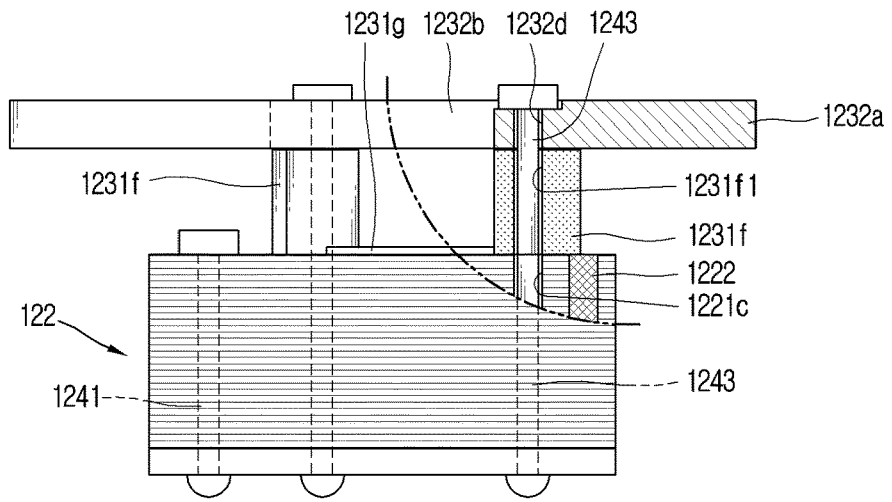
FIG. 14 is an assembled front view of FIG. 13.

FIG. 13 is an exploded perspective view illustrating an example of an inertial core, and FIG. 14 is an assembled front view of FIG. 13.

Referring to FIGS. 13 and 14, a connection part 1231 according to this example can be coupled to an inertial core 1232 as in the examples described above. However, the connection part 1231 can include a plurality of support bosses 1231f. The plurality of support bosses 1231f can be connected to each other by a connecting rib 1231g.

The plurality of support bosses 1231f can have cross-sectional areas the same as or similar to the first fixing portions 1231a, as illustrated in FIG. 8, and be disposed at the same positions as the first fixing portions 1231a. Accordingly, one support boss 1231f can support two permanent magnets 1222 respectively inserted into two permanent magnet mounting holes 1221b facing each other in the circumferential direction of the rotor core 1221.

The plurality of support bosses 1231f can each have a fifth coupling hole 1231f1 formed therethrough in the axial direction. The fifth coupling hole 1231f1 can be formed on the same axis as the first coupling hole 1221c of the rotor core 1221 and the fourth coupling hole 1232d of the inertial core 1232. Accordingly, the inertial core 1232 can be coupled to the rotor core 1221 by the third coupling member 1243 with a long length that passes through the first coupling hole 1221c of the rotor core 1221, the fifth coupling hole 1231f1 of the support boss 1231f, and the fourth coupling hole 1232d of the inertial core 1232.

Each of the plurality of support bosses 1231f can have an axial length that can allow the inertial core 1232 to secure an appropriate insulation distance h from the rotor core 1221, as in the examples described above. Accordingly, magnetic flux leakage from the rotor core 1221 (more precisely, the permanent magnet) to the inertial core 1232 can be suppressed by the connection part 1231 made of the non-magnetic material.

The connecting rib 1231g can extend from a lower or upper outer circumferential surface of one support boss 1231f toward a lower or upper outer circumferential surface of another support boss 1231f, so as to connect the plurality of support bosses 1231f to each other. As the plurality of support bosses 1231f are connected together, the connection part 1231 can be easily assembled.

Since the inertial core 1232 is almost the same as the inertial core of the examples described above, a detailed description thereof will be omitted. However, in this implementation, as a sixth coupling hole 1231f1 is defined in each of the support bosses 1231f of the connection part 1231, a bearing portion through hole 1232b with a circular shape can be formed at the center of the inertial core 1232.

As the connection part 1231 is made of the non-magnetic material and is implemented as the support boss 1231f having a predetermined length in the axial direction, the inertial core 1232 can be coupled to the rotor core 1221 without buckling of the connection part 1231 caused by a coupling force applied when coupling the inertial core 1232 to the rotor core 1221.

As the connection part 1231 is configured as the plurality of support bosses 1231f, the material cost of the connection part 1231 can be reduced. In some examples, a fluid flow path F can be formed between the support bosses 1231f defining the connection part 1231. This can result in reducing fluid resistance during rotation of the rotor 122 to thereby increase the motor efficiency while allowing the connection part 1231 to be installed on the rotor 122.

In some implementations, the plurality of support bosses can be formed independently of each other without being connected together by the connecting rib. Its basic configuration and effects are similar to those of the examples described above, a detailed description thereof will be omitted. However, in this case, the amount of use of non-magnetic material can be further reduced and the area of fluid flow path can be further increased.

Hereinafter, a description will be given of an example of an inertial core.

That is, in the examples described above, the connection part is made of the non-magnetic material, and the inertial core is made of the magnetic material. However, in some cases, both the connection part and the inertial core can be made of magnetic materials.

Figure 15:
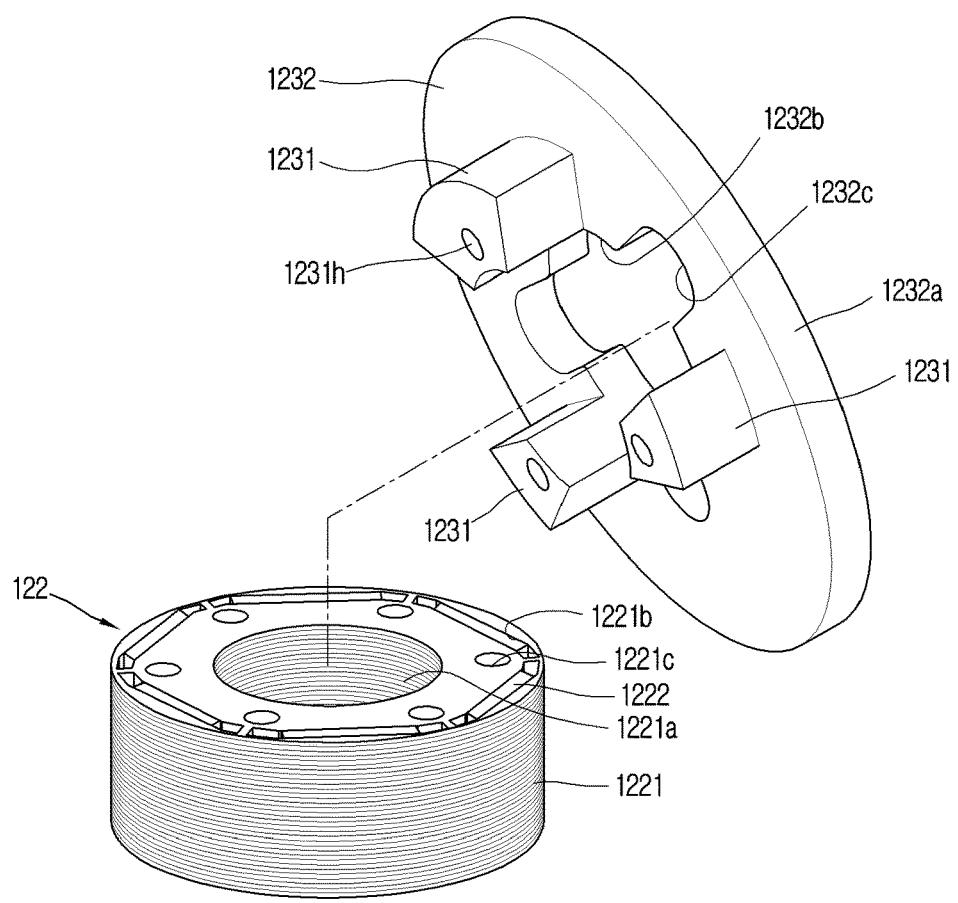
FIG. 15 is an exploded perspective view illustrating an example of an inertial core.
Figure 16:
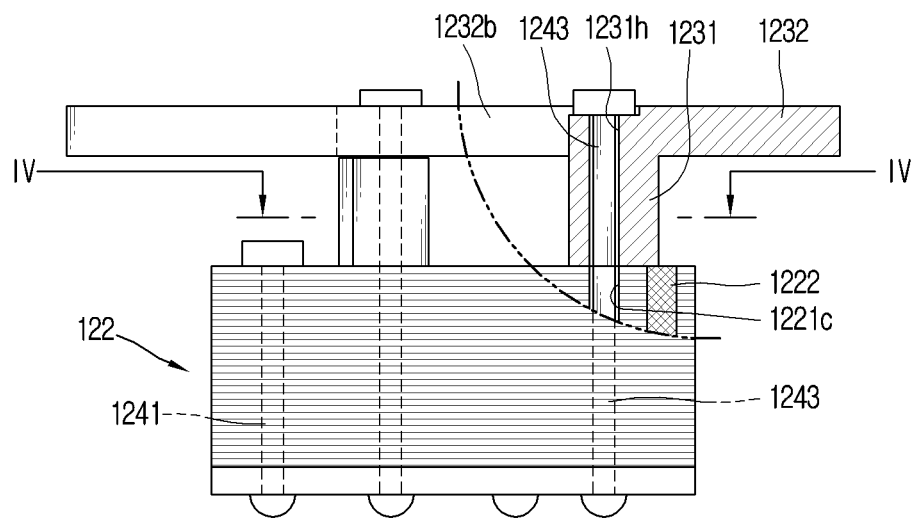
FIG. 16 is an assembled front view of FIG. 15.
Figure 17:
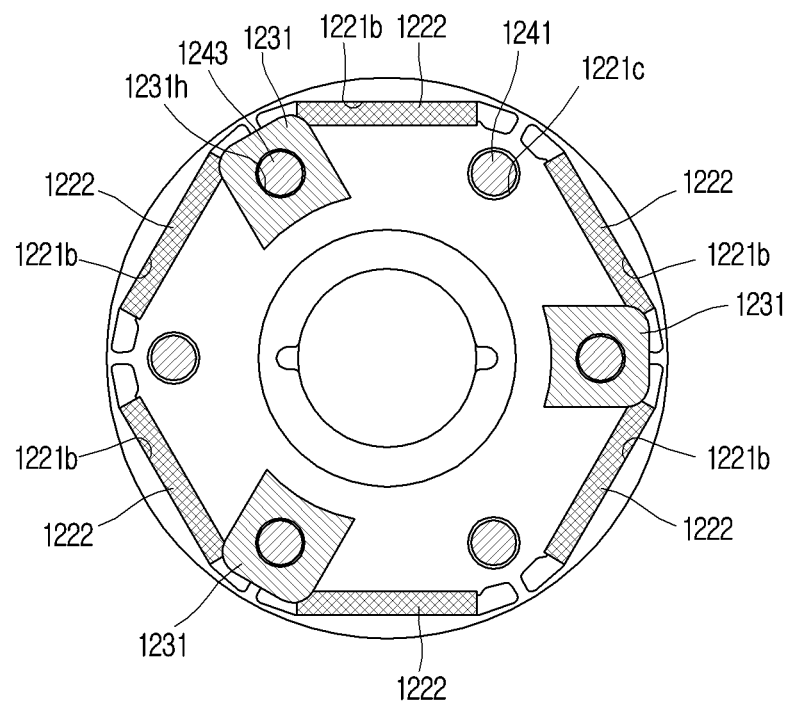
FIG. 17 is a cross-sectional view taken along the line "IV-IV" of FIG. 16.
Figure 18:
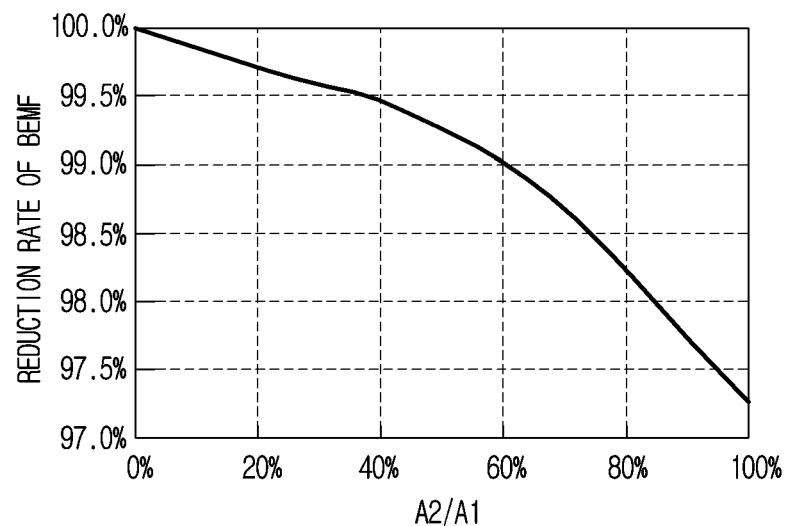
FIG. 18 is a graph showing an example of a reduction rate of back electromotive force according to an overlap area ratio of an inertial core and a permanent magnet.

FIG. 15 is an exploded perspective view of an example of an inertial core, FIG. 16 is an assembled front view of FIG. 15, FIG. 17 is a cross-sectional view taken along the line "IV-IV" of FIG. 16, and FIG. 18 is a graph showing a reduction rate of back electromotive force according to an overlapping area ratio of an inertial core and a permanent magnet.

Referring to FIGS. 15 and 16, an inertial core 1232 can be integrally formed with a connection part 1231 implemented as a boss portion.

More specifically, the connection part 1231 can integrally extend from a lower surface of the inertial core 1232 defining a body portion in the axial direction. Accordingly, the connection part 1231 can be formed of a magnetic material the same as the inertial core 1232.

The connection part 1231 can have a single cylindrical shape. In this case, however, a contact area between the connection part 1231 and the permanent magnet 1222 can increase, and magnetic flux leakage can be increased accordingly. Thus, the connection part 1231 can extend from the inertial core 1232, and be provided in plurality along the circumferential direction.

In some examples, the plurality of connection parts 1231 can have the same cross-sectional area as the first fixing portions 1231a, as illustrated in FIG. 8. In other examples, the plurality of connection parts 1231 can have smaller cross-sectional areas than the first fixing portions 1231a, and be located at the same positions as the first fixing portions 1231a. Accordingly, the plurality of connection parts 1231 can support axial end surfaces of the permanent magnets 1222 inserted into the respective magnet mounting holes 1221b of the rotor core 1221. For example, a center of one connection part 1231 can be disposed between two adjacent permanent magnets 1222 so as to cover both of the two permanent magnets 1222 while supporting them in the axial direction.

A seventh coupling hole 1231h can be defined in each of the plurality of connection parts 1231. In other words, the seventh coupling holes 1231h can be formed at the plurality of connection parts 1231, respectively.

The seventh coupling hole 1231h can extend on the same axis from a lower end of the connection part 1231 to an upper surface of the inertial core 1232. Accordingly, the inertial core 1232 including the connection parts 1231 can be coupled to the rotor core 1221 by the long third coupling members 1243 that penetrate from the upper end of the inertial core 1232 to the lower end of the rotor core 1221. Even in this case, the rotor core 1221 can be coupled by the third coupling members 1243 and the first coupling members 1241 each having an intermediate length and disposed between two third coupling members 1243 in the circumferential direction.

The plurality of connection parts 1231 can have the same axial length. For example, the connection parts 1231 can each have an axial length that allows the inertial core 1232 to secure an appropriate insulation distance h from the rotor core 1221 as in the examples described above, which can be suitable for suppressing magnetic flux leakage.

Since the connection parts 1231 is made of the magnetic material as described above, magnetic flux leakage from the permanent magnets 1222 inserted into the rotor core 1221 can occur through the connection parts 1231. However, as illustrated in FIG. 17, the connection parts 1231 can be configured such that ends of two permanent magnets 1222 facing each other are supported by one connection part 1231 provided in an overlapping manner. By minimizing an overlapping area between the magnetic connection part 1231 and the permanent magnets 1222, magnetic flux leakage can be reduced.

For example, referring to FIG. 18, when a cross-sectional area of the permanent magnet 1222 is A1 and a cross-sectional area of the connection part 1231 overlapping the permanent magnet 1222 is A2, A2/A1 can be approximately 60% or less.

When A2/A1 is approximately 60% or more, it can be seen that a reduction rate of back electromotive force (BEMF) is 1% or more. Thus, A2/A1 should be approximately 60% or less for controlling the reduction rate of the BEMF at 1% or less, allowing a decrease in efficiency of the motor and the compressor to be suppressed.

Since the inertial core 1232 is substantially the same as the inertial core of the example of FIG. 3 or FIG. 13, a detailed description thereof will be omitted. However, as the inertial core 1232 is integrally formed with the connection part 1231, the inertial core 1232 can be made of the same magnetic material as the connection part 1231.

As two permanent magnets 1222 are axially supported by one connection part 1231 implemented as the boss portion, the connection part 1231 can be formed of the magnetic material, and a contact area between the connection part 1231 and the permanent magnets 1222 can be reduced, thereby minimizing magnetic flux leakage. This can lower the reduction rate of the BEMF to thereby suppress a decrease in efficiency of the motor and the compressor.

In some examples, the plurality of permanent magnets 1222 can be securely supported while minimizing the number of connection parts 1231 implemented as the boss portion. Accordingly, a wide (or large) fluid flow path F can be secured between the rotor core 1221 and the inertial core 1232 to thereby reduce fluid resistance, allowing the efficiency of the motor and the compressor to be increased.

Hereinafter, a description will be given of an example of an inertial core.

That is, in the examples described, the inertial core is formed in a flat plate shape having the same thickness at a central portion and an edge portion. However, in some cases, the central portion and the edge portion can have different thicknesses.

Figure 19:
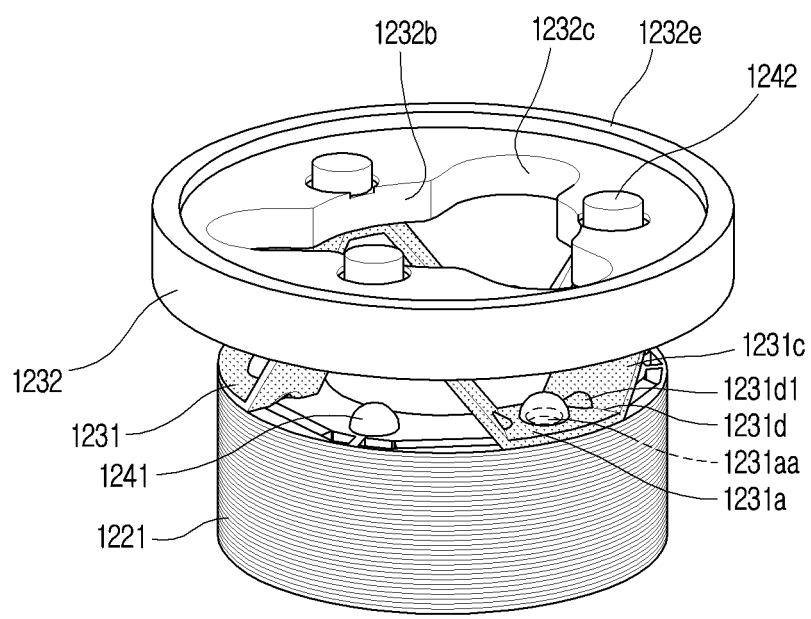
FIG. 19 is a perspective view illustrating an example of a second inertial core.

FIG. 19 is a perspective view illustrating an example of an inertial core.

Referring to FIG. 19, an inertial core 1232 can have an annular shape and be further provided at its edge with a mass portion 1232*e*. For example, the inertial core 1232 can include the mass portion 1232*e* protruding from an edge of an upper surface of a body portion 1232*a* having an annular shape.

In some implementations, the mass portion 1232*e* can be formed in an annular shape as shown in FIG. 19. In some examples, an outer diameter of the mass portion 1232*e* can be equal to an outer diameter of the body portion 1232*a*, but an inner diameter of the mass portion 1232*e* can be greater than an inner diameter of the body portion 1232*a*. Then, the mass portion 1232*e* can be concentrated on the edge of the body portion 1232*a* on the plan, and thus centrifugal force due to the mass portion 1232*e* can be enhanced.

The mass portion 1232*e* can be formed as a single body with the body portion 1232*a*. In some examples, the mass portion 1232*e* can be formed in various manners. For example, the mass portion 1232*e* can be assembled or attached to the upper surface of the body portion 1232*a*, formed by folding or rolling, or formed by bending.

In some implementations, the mass portion can be formed eccentrically. For example, the mass portion can have an arcuate shape. In this case, the mass portion serves as a balance weight. Therefore, when the mass portion is formed eccentrically, it can be appropriately formed in consideration of the degree of unbalance of the electric motor such as the plate portion that is provided on the rotating shaft and serves as a balance weight and the like.

When the mass portion 1232*e* is formed at the body portion 1232*a* of the inertial core 1232, weight of the inertial core 1232 can be increased under the condition that the outer diameter of the inertial core 1232 is the same. This can increase rotational inertia of the inertial core 1232 to thereby improve the motor efficiency of the electric motor and the compressor efficiency.

Hereinafter, a description will be given of an example of an inertial core.

That is, in the examples described above, the inertial core and the rotor core made of different materials are assembled together. However, in some cases, the inertial core can be made of the same material as the rotor core.

Figure 20:
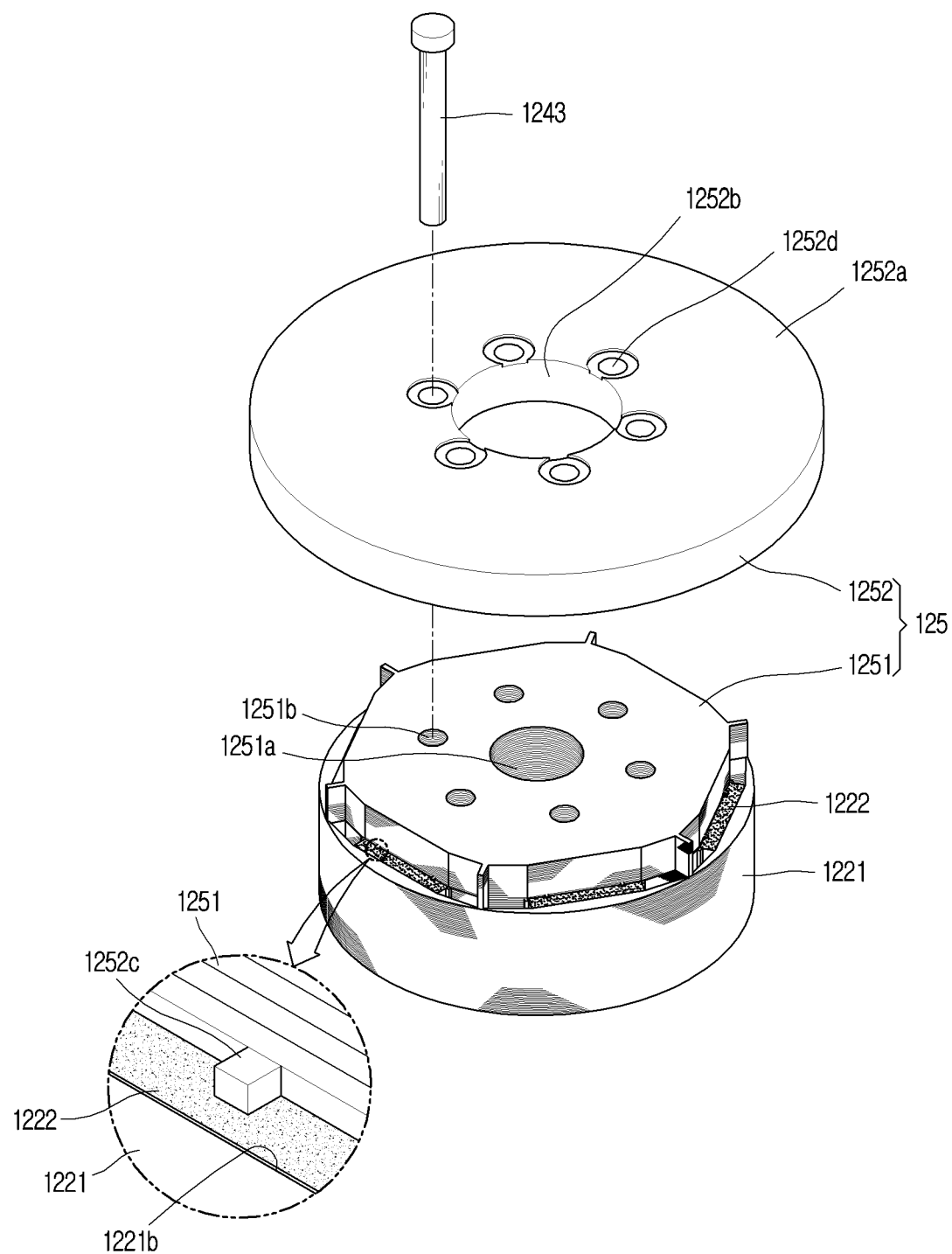
FIG. 20 is an exploded perspective view illustrating examples of a rotor core and an inertial core.
Figure 21:
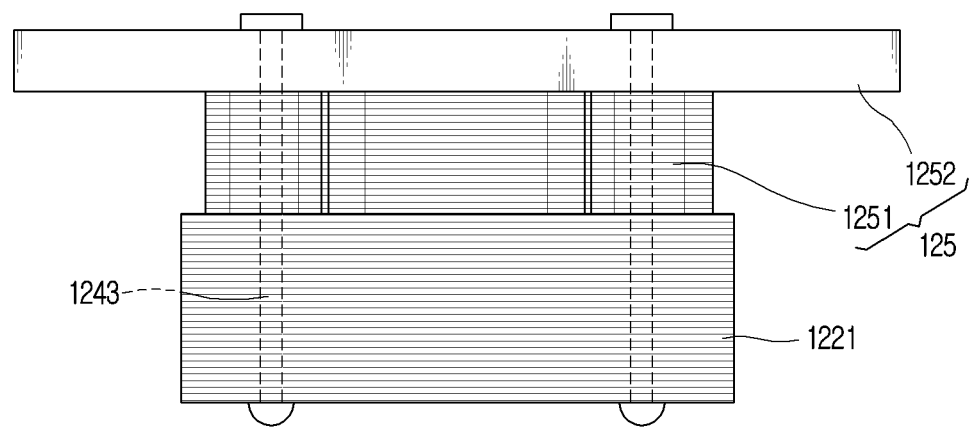
FIG. 21 is an assembled front view of FIG. 20.

FIG. 20 is an exploded perspective view illustrating an example of a rotor core and an inertial core, and FIG. 21 is an assembled front view of FIG. 20.

Referring to FIGS. 20 and 21, an inertial core 125 can be coupled to one end of a rotor core 1221 in the axial direction defining the rotor 122.

Since the rotor core 1221 can be the same as or similar to the examples described above, a detailed description thereof will be omitted.

The inertial core 125 can include a first inertial core 1251 and a second inertial core 1252. Either one of the first inertial core 1251 or the second inertial core 1252 can be made of the same material and the same method as the rotor core 1221. In this implementation, the first inertial core 1251 that is coupled to the rotor core 1221 can be made of the same material and the same method as the rotor core 1221.

In some examples, a through hole 1251*a* extending from the shaft hole of the rotor core 1221 can be formed at a center of the first inertial core 1251, and coupling holes 1251*b* can be defined in a circumference of the through hole 1251*a*. The coupling holes 1251*b* of the first inertial core 1251 can be formed on the same axis as the coupling holes of the rotor core 1221, and coupling holes 1252*d* of the second inertial core 1252 to be described hereinafter. Accordingly, the first inertial core 1251 together with the second inertial core 1252 can be coupled to the upper end of the rotor core 1221 by the long third coupling members 1243 penetrating from an upper end of the second inertial core 1252 to the lower end of the rotor core 1221.

The first inertial core 1251 can be formed by stacking a plurality of electrical steel sheets like the rotor core 1221. Accordingly, the first inertial core 1251 can be magnetic the same as the rotor core 1221.

However, the first inertial core 1251 can be disposed so as not to be in direct contact with the permanent magnets 1222 inserted into the rotor core 1221. For example, the rotor core 1221 can have substantially the same axial length as the stator core 1121 and be located within the stator core 1121 range, and the first inertial core 1251 can be located out of the axial range of the stator core 1121.

In some examples, the first inertial core 1251 can be disposed such that at least a portion thereof overlaps an end portion of the permanent magnet 1222 in the radial direction, thereby restricting separation of the permanent magnet 1222 in the axial direction.

In detail, the first inertial core 1251 can be located above the rotor core 1221 in the axial direction and located more radially inward than the permanent magnet 1222. A magnet support protrusion 1252*c* extending in the radial direction to overlap the permanent magnet 1222 in the radial direction can be further provided at an outer surface of the first inertial core 1251, more specifically, the outermost electrical steel sheet of the first inertial core 1251 that is in contact with the rotor core 1221. The magnet support protrusion 1252*c* can allow the first inertial core 1251 to be located more inward than the permanent magnet 1222 and restrict an axial separation of the permanent magnet 1222.

In some examples, the first inertial core 1251 can have a length capable of minimizing magnetic flux leakage from the permanent magnet 1222, for example, a length greater (longer) than a thickness of the second inertial core 1252 to be described hereinafter, or at least 4 mm or more. As a result, magnetic flux leakage from the permanent magnet 1222 to the second inertial core 1252 to be described later can be suppressed.

The second inertial core 1252 can be coupled by being in close contact with the upper surface of the rotor core 1221. The second inertial core 1252 can be coupled to the first inertial core 1251 by the third coupling members 1243 penetrating through the rotor core 1221, or by welding or an adhesive. Other configurations that allow the second inertial core 1252 to be firmly coupled to the rotor core 1221, such as being coupled to the first inertial core 1251 in an engaged manner, can also be available. In some implementations, the second inertial core 1252 can be coupled to the rotor core 1221.

The basic configuration and operational effects of the second inertial core 1252 are similar to those of the inertial core of the examples described above, so a detailed description thereof will be omitted. That is, a mass portion 1252a of the second inertial core 1252 can have a disk shape so that a shaft hole 1252b is defined at a center thereof, and a plurality of coupling holes 1252d are formed around the shaft hole 1252b.

Since the second inertial core 1252 is formed of a magnetic material and is coupled to the first inertial core 1251 that is also made of a magnetic material, magnetic flux leakage from the permanent magnet 1222 can be facilitated. However, the first inertial core 1251 can be configured to minimize an overlapping area with the permanent magnet 1222 and at the same time secure an axial height of the first inertial core 1251 as long (great) as possible, for example, 4 mm or more at which the reduction rate of back electromotive force is less than 1%. Accordingly, both the first inertial core 1251 and the second inertial core 1252 can be made of the magnetic material, and the magnetic flux leakage from the permanent magnet 1222 can be minimized.

In some examples, an outer diameter of the second inertial core 1252 can be greater than an outer diameter of the rotor core 1221 enough to overlap the stator coil 1212 in the radial direction. Accordingly, centrifugal force of the second inertial core 1252 can be increased to thereby enhance rotational inertia of the rotor 122.

In some implementations, insulation pads made of a non-magnetic material can be disposed between the rotor core 1221 and the first inertial core 1251, and between the first inertial core 1251 and the second inertial core 1252, respectively.

However, the first inertial core 1251 can be have an axial length (e.g., 4 mm or more) capable of minimizing magnetic flux leakage from the permanent magnet 1222. In this case, the second inertial core 1252 can secure an appropriate insulation distance from the permanent magnet 1222 to thereby minimize a thickness of the insulation pad. For example, by forming the insulation pad much thinner than the second inertial core 1252, an increase in manufacturing costs due to an excessive use of the non-magnetic material can be suppressed.

Hereinafter, a description will be given of an example of an inertial core.

That is, in the previous example, the inertial core is implemented as the first inertial core and the second inertial core, but in some cases, a third inertial core can be further provided.

Figure 22:
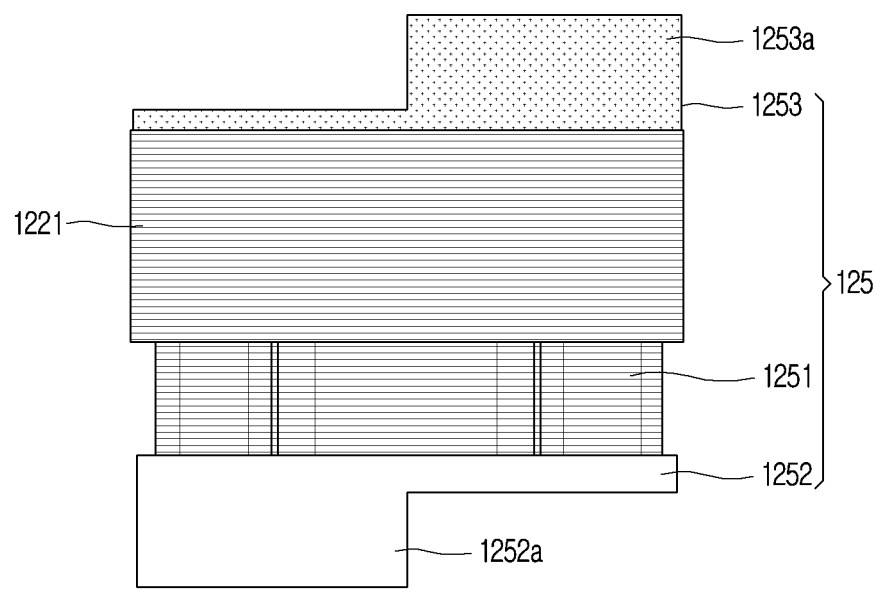
FIG. 22 is an assembled front view illustrating examples of a rotor core and an inertial core.

FIG. 22 is an assembled front view illustrating examples of a rotor core and an inertial core.

Referring to FIG. 22, a rotor core 1221 can be formed in the same manner as the rotor core of FIG. 20. Thus, a detailed description thereof will be omitted.

An inertial core 125 can include a first inertial core 1251 and a second inertial core 1252 provided at one end (e.g., lower end) of the rotor core 1221 in the axial direction, and a third inertial core 1253 provided at another end of the rotor core 1221 in the axial direction.

The basic configurations of the first inertial core 1251 and the second inertial core 1252 are similar to those of the example of FIG. 20. The first inertial core 1251 is formed by stacking electrical steel sheets like the rotor core 1221, which is the same as the first inertial core in FIG. 20, so a description thereof will be omitted.

However, the second inertial core 1252 can be different from the second inertial core in FIG. 20. For example, an outer diameter of the second inertial core 1252 can be the same as the outer diameter of the rotor core 1221, and a mass portion 1253a can be further provided. The mass portion 1253a can be formed in an annular shape. In some examples, the mass portion 1253a can alternatively be formed in an arcuate shape to be eccentric in a direction opposite to the mass portion 1253a of the third inertial core 1253.

The third inertial core 1253 can be coupled to the upper end of the rotor core 1221, and cover and support one end of the permanent magnet in the axial direction that is inserted into the rotor core 1221. Accordingly, magnetic flux leakage can be minimized when the third inertial core 1253 is made of a non-magnetic material.

The third inertial core 1253 can be formed substantially the same as the second inertial core 1252. For example, an outer diameter of the third inertial core 1253 can be substantially the same as the outer diameter of the rotor core 1221. Accordingly, a relatively expensive non-magnetic material used for the third inertial core 1253 can be reduced to thereby suppress an increase in manufacturing costs of the inertial core 125 of the electric motor.

The third inertial core 1253 can be provided with the mass portion 1253a having an arcuate shape. The mass portion 1253a of the third inertial core 1253 can be configured such that eccentric mass is generated in a direction opposite to a mass portion 1252a of the second inertial core 1252. Accordingly, an unbalanced force transmitted through the rotating shaft 130 can be effectively offset by the second inertial core 1252 and the third inertial core 1253.

As the first inertial core 1251 and the second inertial core 1252 are mounted on one end of the rotor core 1221, and the third inertial core 1253 is mounted on another end of the rotor core 1221, rotational inertia of the rotor can be increased even when the electric motor is reduced in size, thereby improving the motor efficiency.

The foregoing description has been given of specific implementations of the present disclosure. However, the present disclosure can be implemented in various forms without departing from the spirit or essential characteristics thereof, and thus the implementations described above should not be limited by the detailed description provided herein.

Moreover, even if any implementation is not specifically disclosed in the foregoing detailed description, it should be broadly construed within the scope of the technical idea, as defined in the accompanying claims. Furthermore, all modifications and variations that fall within the metes and bounds of the claims, or equivalents of such metes and bounds are therefore intended to be embraced by the appended claims.

What is claimed is:

1. An electric motor comprising:
   a stator;
   a rotor configured to rotate relative to the stator, the rotor comprising a rotating shaft, a rotor core coupled to the rotating shaft, and a plurality of permanent magnets that are inserted into the rotor core and spaced apart from one another in a circumferential direction;

an inertial core made of a magnetic material and spaced apart from the rotor in an axial direction; and a connection part made of a non-magnetic material and disposed between the rotor and the inertial core in the axial direction, the connection part being disposed at an axial end portion of the rotor core, wherein the connection part comprises a single body that comprises:
- a plurality of first fixing portions coupled to the axial end portion of the rotor core,
- a plurality of second fixing portions spaced apart from the plurality of first fixing portions in the axial direction and coupled to the inertial core, and
- a plurality of link portions that extend toward one another and are bent from the plurality of first fixing portions and the plurality of second fixing portions, each of the plurality of link portions connecting one of the plurality of first fixing portions to one of the plurality of second fixing portions.

2. The electric motor of claim 1, wherein the plurality of first fixing portions are spaced apart from one another by first predetermined intervals in the circumferential direction, and wherein the plurality of second fixing portions are spaced apart from one another by second predetermined intervals in the circumferential direction.

3. The electric motor of claim 2, wherein the plurality of first fixing portions and the plurality of second fixing portions protrude in the axial direction and are alternately arranged along the circumferential direction.

4. The electric motor of claim 1, wherein each of the plurality of first fixing portions includes:
- a first inner arcuate end portion,
- a first outer arcuate end portion disposed radially outward relative to the first inner arcuate end portion, and
- a plurality of first linear end portions that radially connect ends of the first inner arcuate end portion to ends of the first outer arcuate end portion, respectively, each of the ends of the first inner arcuate end portion radially facing one of the ends of the first outer arcuate end portion, and wherein each of the plurality of second fixing portions includes:
- a second inner arcuate end portion,
- a second outer arcuate end portion disposed radially outward relative to the second inner arcuate end portion, and
- a plurality of second linear end portions that connect ends of the second inner arcuate end portion to ends of the second outer arcuate end portion, respectively, each of the ends of the second inner arcuate end portion radially facing one of the ends of the second outer arcuate end portion.

5. The electric motor of claim 4, wherein each of the plurality of link portions extends in a lengthwise direction and connects one of the plurality of first linear end portions to one of the plurality of second linear end portions.

6. The electric motor of claim 1, wherein each of the plurality of first fixing portions covers at least portions of the plurality of permanent magnets in the axial direction.

7. The electric motor of claim 1, wherein a circumferential center of one of the plurality of first fixing portions is disposed between two adjacent permanent magnets among the plurality of permanent magnets in the circumferential direction.

8. The electric motor of claim 1, wherein the connection part further comprises:

- a plurality of bending line portions that are defined (i) between one of the plurality of first fixing portions and one of the plurality of link portions that face each other, and (ii) between one of the plurality of second fixing portions and one of the plurality of link portions that face each other; and
- a plurality of reinforcing ribs, each of the plurality of reinforcing ribs protruding from one of the plurality of bending line portions.

9. The electric motor of claim 1, wherein at least a portion of the connection part is inclined with respect to the axial direction.

10. The electric motor of claim 9, wherein the plurality of link portions are inclined in alternate directions with respect to the axial direction and disposed along the circumferential direction.

11. The electric motor of claim 1, wherein at least a portion of the connection part is inclined with respect to an end surface of the rotor core by a predetermined inclination angle, and wherein the predetermined inclination angle is greater than or equal to 20 degrees and less than 90 degrees.

12. The electric motor of claim 1, wherein a height of the connection part in the axial direction is greater than or equal to a thickness of the inertial core, or greater than or equal to 4 mm.

13. The electric motor of claim 1, wherein the connection part further comprises:
- a plurality of boss portions that are respectively disposed at the plurality of first fixing portions and axially extend toward the inertial core, or that are respectively disposed at the plurality of second fixing portions and axially extend toward the rotor core, and wherein end portions of the plurality of boss portions are axially supported by the inertial core or the rotor core.

14. The electric motor of claim 1, wherein the inertial core comprises a plate body having a circular shape, and wherein an outer diameter of the plate body is greater than a width of the connection part in a radial direction.

15. The electric motor of claim 1, wherein the inertial core defines a through hole passing through a center of the inertial core.

16. The electric motor of claim 15, wherein the rotor core defines a plurality of first coupling holes that extend parallel to the plurality of permanent magnets and are arranged along the circumferential direction, wherein the connection part defines a plurality of second coupling holes at the plurality of first fixing portions, respectively, each of the plurality of second coupling holes facing one of the plurality of first coupling holes, and wherein the connection part and the rotor core are coupled to each other through the plurality of first coupling holes and the plurality of second coupling holes.

17. The electric motor of claim 16, wherein the connection part further defines a plurality of third coupling holes at the plurality of second fixing portions, respectively, wherein the inertial core defines a plurality of fourth coupling holes that faces the plurality of third coupling holes, respectively, and wherein the connection part and the inertial core are coupled to each other through the plurality of third coupling holes and the plurality of fourth coupling holes.

18. The electric motor of claim 17, wherein the inertial core further defines a plurality of grooves that extend from the through hole in a radial direction, and wherein the plurality of grooves and the plurality of fourth coupling holes are alternately arranged along the circumferential direction.

19. The electric motor of claim 1, further comprising a mass portion disposed on at least one axial surface of the inertial core such that an axial thickness of an outer circumferential side of the inertial core is different from an axial thickness of an inner circumferential side of the inertial core.

20. A hermetic compressor comprising the electric motor of claim 1, wherein the hermetic compressor further comprises:
   a shell that accommodates the electric motor; and
   a compression unit disposed in the shell and configured to compress a refrigerant, and
   wherein the electric motor is configured to provide a driving force to the compression unit.

21. The hermetic compressor of claim 20, wherein the compression unit comprises:
   a cylinder;
   a piston disposed in the cylinder; and
   a connecting rod having one end connected to the piston and another end connected to the rotating shaft of the electric motor.

* * * * *